(12) United States Patent
Ohta et al.

(10) Patent No.: US 8,310,792 B2
(45) Date of Patent: Nov. 13, 2012

(54) MAGNETO-RESISTIVE ELEMENT FOR A MAGNETO-RESISTIVE DEVICE AND METHOD OF MANUFACTURING THEREOF

(75) Inventors: Naoki Ohta, Tokyo (JP); Hiroshi Yamazaki, Tokyo (JP)

(73) Assignee: TDK Corporation, Tokyo (JP)

( * ) Notice: Subject to any disclaimer, the term of this patent is extended or adjusted under 35 U.S.C. 154(b) by 1385 days.

(21) Appl. No.: 11/984,243

(22) Filed: Nov. 15, 2007

(65) Prior Publication Data

US 2009/0130491 A1    May 21, 2009

(51) Int. Cl.
*G11B 5/33* (2006.01)
(52) U.S. Cl. .............................. 360/324.12; 360/324.11
(58) Field of Classification Search . 360/324.11–324.12
See application file for complete search history.

(56) References Cited

U.S. PATENT DOCUMENTS

| | | | |
|---|---|---|---|
| 7,035,062 B1 | 4/2006 | Mao et al. | |
| 7,177,122 B2* | 2/2007 | Hou et al. | 360/324.12 |
| 7,271,986 B2 | 9/2007 | Sapozhnikov et al. | |
| 2003/0214764 A1* | 11/2003 | Sapozhnikov et al. | 360/324.12 |
| 2008/0102316 A1* | 5/2008 | Akimoto et al. | 428/811.2 |

* cited by examiner

*Primary Examiner* — Julie Anne Watko
*Assistant Examiner* — Carlos E Garcia
(74) *Attorney, Agent, or Firm* — Posz Law Group, PLC

(57) ABSTRACT

A magnetoresistive element (MR element) for reading a change in a magnetic field of a magnetic recording medium includes first and second electrode layers for providing a sensing current, which are perpendicular to an air bearing surface (ABS) facing the magnetic recording medium, first and second free layers which have a magnetization direction which changes in accordance with an external magnetic field, and a spacer layer composed of non-magnetic material. A ratio of a representative width and a representative length of each of the first and second free layers is at least 2 to 1, to thereby provide initial magnetizations along a direction of the representative length of each of the first and second free layers.

13 Claims, 14 Drawing Sheets

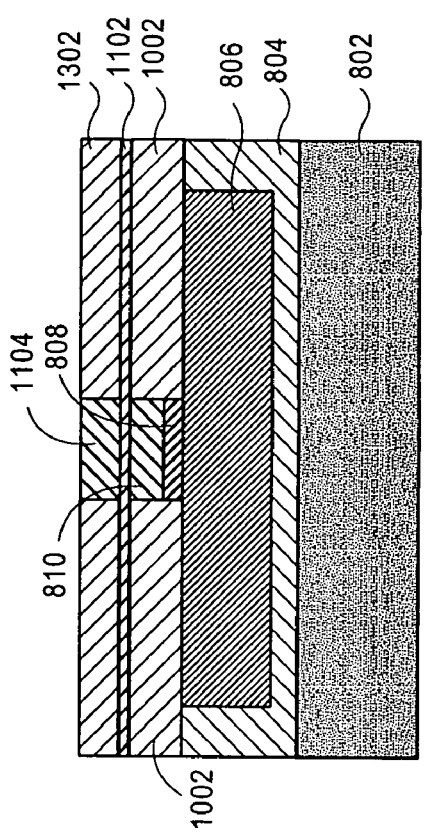
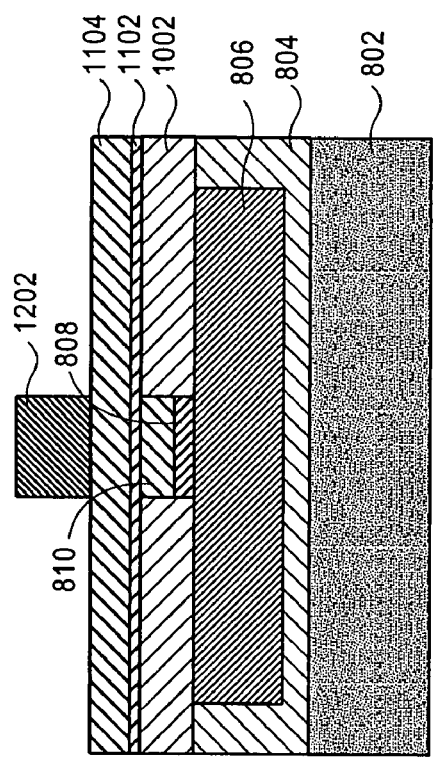
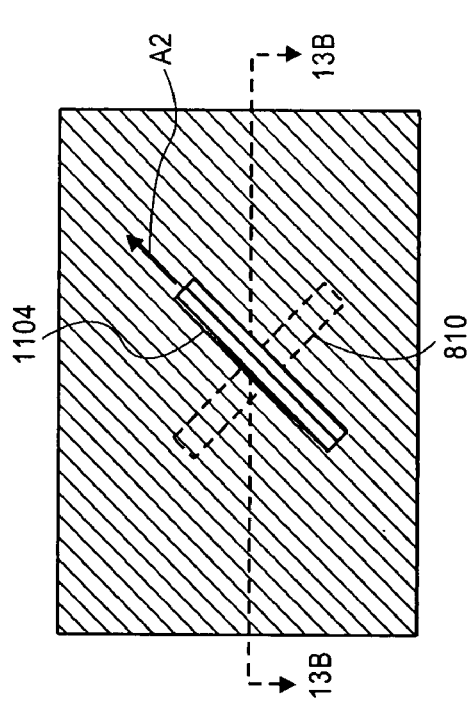
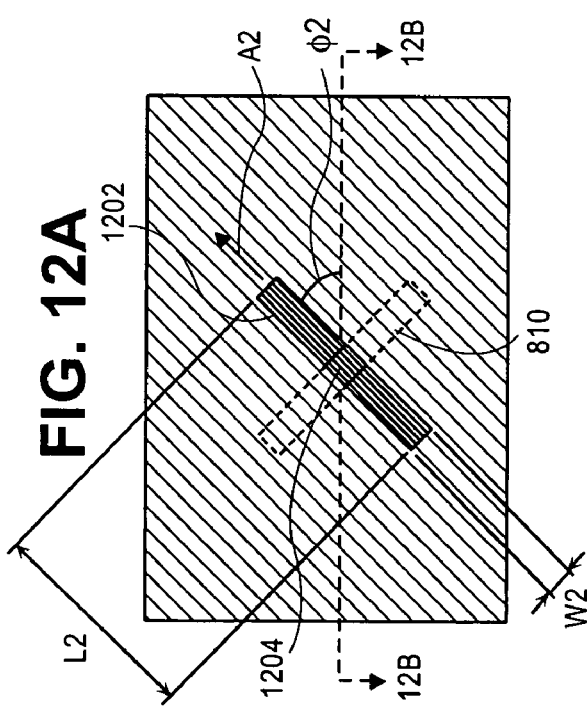

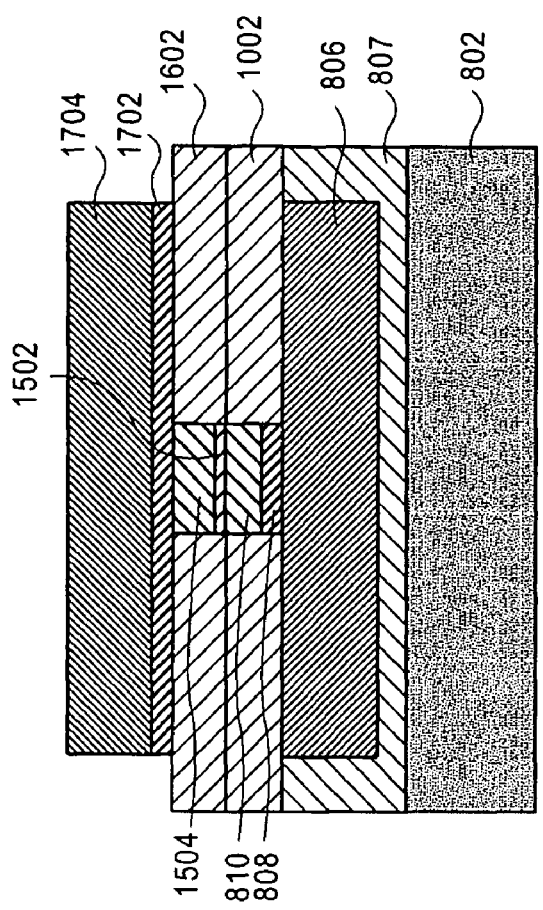
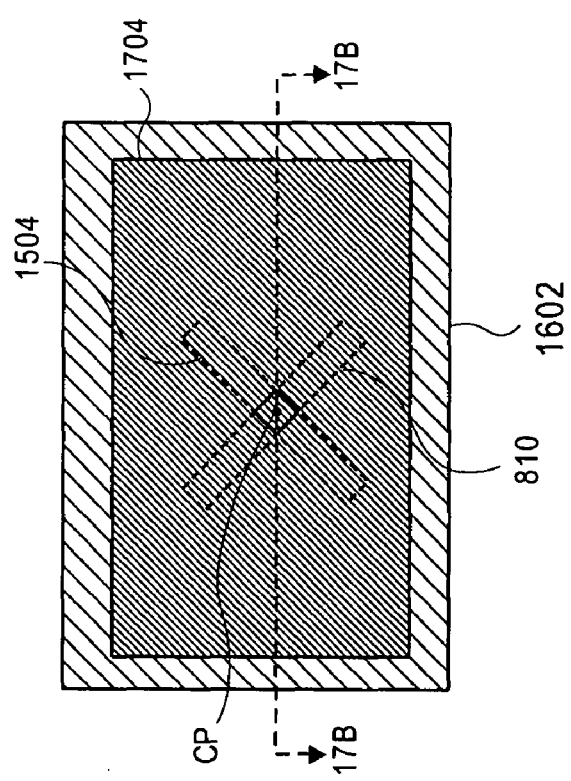
FIG. 17B
FIG. 17A

MAGNETO-RESISTIVE ELEMENT FOR A MAGNETO-RESISTIVE DEVICE AND METHOD OF MANUFACTURING THEREOF

TECHNICAL FIELD

The technical field relates generally to a magneto-resistive device for a disk apparatus for reading information on a magnetic recording medium, and, more particularly, to a magneto-resistive element for the magneto-resistive device.

BACKGROUND

Description of the Related Art

For reading information on a magnetic recording medium such as a hard disk, a thin film magnetic head having a magneto-resistive (MR) device exhibiting the MR effect is widely used. In recent years, as the recording density of magnetic recording medium becomes higher and higher, a thin film magnetic head using a giant magnetoresistive device (GMR device) exhibiting the GMR effect is commonly used. An example of the GMR device is a spin valve (SV) type GMR device.

The SV-type GMR device has an SV film obtained by stacking a magnetic layer (magnetization pinned layer) whose magnetization direction is pinned in a predetermined direction and a magnetization free layer (free layer) whose magnetization direction changes according to an external signal magnetic field, with a nonmagnetic intermediate layer in between. In a read operation, for example, sensing current flows in a stack layer planar direction. Such a GMR device is called, in particular, a CIP (Current in Plane)-GMR device. In this case, the electrical resistance (that is, voltage) changes when sensing current is passed according to relative angles of the magnetization direction in the two magnetic layers (the magnetization pinned layer and the magnetization free layer) of the SV film.

Recently, a thin film magnetic head having a CPP (Current Perpendicular to the Plane)-GMR element constructed so that sensing current flows in a stacking direction of the SV film is being developed to address further improvement in recording density. Such a CPP-GMR element has, generally, the SV film, a pair of magnetic domain control films disposed so as to face each other while sandwiching the SV film in a direction corresponding to a read track width direction via an insulating film, and upper and lower electrodes formed so as to sandwich the SV film and the pair of magnetic domain control films in a stacking direction. The upper and lower electrodes also serve as upper and lower shield films. The CPP-GMR element having such a configuration has an advantage such that, in case of reducing the dimension in the direction of the read track width, a higher output can be obtained as compared with a CIP-GMR element. Concretely, in the CIP-GMR element, sensing current is passed in the in-plane direction so that, in association with reduction in the dimension in the read track width direction, a magneto-sensitive part through which the sensing current passes becomes smaller, and a voltage change amount decreases. In comparison, in the CPP-GMR element, sensing current is passed in the stacking direction, so that the influence of reduction in the dimension in the read track width direction on the voltage change amount is small. Accordingly, CPP-GMR element has been used in order to further improve a recording density.

In the conventional CPP-GMR element, an antiferromagnetic layer as well as magnetic film is required for fixing the magnetization direction. The basic structure has a tri-layer configuration including a free layer, a non-magnetic intermediate layer, and a pin layer composed of magnetic and antiferromagnetic film. The antiferromagnetic film of the pin layer is essential for fixing the magnetization direction of the magnetic layer. However, the considerable thickness of the antiferromagnetic film required can hinder further thinning of the thin film of the CPP-GMR element.

U.S. Pat. No. 7,177,122 to Hou et al. (hereafter: "Hou"), the contents of which are incorporated by reference, discloses an approach for thinning the thin film of the CPP-GMR element. In Hou, a scissor-shaped MR element includes a non-magnetic intermediate layer sandwiched by first and second free layers. As shown in FIG. 7 of Hou, the first and second free layers 12', 16' include first and second bias layers 80, 82, respectively, for providing magnetizations in fixed directions. According to this construction, it is possible to fix the direction of the magnetizations of the first and second magnetic free layers.

U.S. Pat. No. 7,035,062 to Mou et al. (hereafter: "Mou"), the contents of which are incorporated by reference, discloses a tunneling magneto-resistive read sensor that includes first and second electrodes and a stack positioned between the electrodes. The stack includes first and second free layers with magnetization orientations that are biased relative to each other. A sensing current is passed between the first and second free layers of the stack. The amount of current passing through the first and second free layer changes based upon the orientation of the first and second free layers relative to each other.

SUMMARY

According to the construction of the MR device shown in U.S. Pat. No. 7,177,122 to Hou, the thin film can be further thinned (miniaturized) by eliminating the stacked antiferromagnetic film. However, this construction also has drawbacks such as, for example, the requirement to arrange the bias layers on the periphery of the magnetic free layers to precisely fix the magnetic field directions of the magnetic free layers. Particularly, if the initial magnetizations of the first and second magnetic free layers are not set at a fixed angle such as, for example, a perpendicular angle, the symmetry of the amount of variation between the on and off current accompanying the movement of the recording medium cannot be realized. Further, the magnetic field of the bias layer can leak into the outer periphery, thereby having a physical affect on the magnetic recording medium, and also affecting the data read operation.

Accordingly, in consideration of the problems discussed above, a MR element for reading a change in magnetic field of a magnetic recording medium according to various embodiments is proposed. Although the MR element has a scissor-shaped configuration including first and second free layers, the setting of the initial magnetization directions of the free layers can be easily realized, and, if desirable, the bias layers can be eliminated, and the MR element can be miniaturized.

The MR element according to a first aspect includes: first and second electrode layers for providing a sensing current, the first and second electrode layers disposed in parallel to each other along a moving direction of the magnetic recording medium, and perpendicular to an air bearing surface (ABS) facing the magnetic recording medium; first and second magnetization free layers (free layers) disposed between the pair of electrode layers in a stacking configuration, the first and second free layers having a magnetization direction which changes in accordance with an external magnetic field;

and a spacer layer composed of non-magnetic material and disposed between the first and second free layers.

A ratio of a representative length and a representative width of each of the first and second free layers is at least 2 to 1, to thereby provide an initial magnetization direction along the representative length of each of the first and second free layers, the representative width and the representative length defined in a plane perpendicular to the ABS.

The first and second free layers include an overlapping region in a vicinity of the ABS in which the first and second free layers overlap each other in the moving direction of the magnetic recording medium, the first and second free layers overlapping each other at a substantially perpendicular angle.

DEFINITION OF TERMS

The representative width and representative length are defined with respect to a measurement of the shape of the first and second free layers. For example, if the first and second free layers have a rectangular shape, the representative length can be a measurement in the longer side direction and the representative width can be a measurement along the shorter side direction. If the first and second free layers have an elliptical shape, the representative length can be defined by the longer axis and the representative width can be defined along the shorter axis. If the free layers have a triangular shape, the representative length can be defined by a measurement of the height of the triangle and the representative width can be defined by a measurement of the base of the triangle.

The sensing current refers to a current flowing between the first and second electrode layers. The MR element reads a change in the voltage in response to the magnetic field of the magnetic recording medium.

The first and second free layers are shown in, for example, FIG. 5. The first free layer can correspond to the lower magnetization free layer 503a and the second free layer can correspond to the upper magnetization free layer 503b, although the MR element according to various embodiments is not limited to such a configuration.

It should be noted that the overlapping region in which the first and second free layers overlap each other is not limited to directly face the ABS. For example, a protective film may be disposed at the ABS.

The substantially perpendicular angle at which the first and second free layers overlap each other can be defined based upon an intersection at the Z-axis. However, the angle at which the first and second free layers overlap each other is not strictly limited to 90°, and can deviate by 15° depending on the precision of the construction. In other words, the angle at which the first and second free layers overlap each other can be from 75° to 105°.

A MR element having the scissor-shaped configuration of the free layers according to various embodiments proposed can achieve various advantages. The MR element can read a variation in the magnetic field that is smaller than that which can be read by the conventional MR element. Further, the initial magnetizations of the free layers can be fixed without using a bias layer or by using a smaller bias layer, thereby permitting the MR element to have a miniaturized thin film. The MR element does not require adjustment of the magnetization directions as long as the free layers have a predetermined shape because the directions of the initial magnetizations mainly exist in accordance with the shape of the free layers. Accordingly, the fabrication of the MR element can be easily achieved. Further, changes in the properties of the free layer resulting from applied external magnetic fields can be reduced because the shape of the free layers is used to define the initial magnetizations to some degree. In a case in which the MR element does not use antiferromagnetic film for forming the pin layer, the affects of heat from the antiferromagnetic film can be avoided.

Bias Layers

The MR element for reading a change in magnetic field of a magnetic recording medium according to a second aspect includes first and second bias layers disposed in a region at the vicinity of the first and second free layers. The magnetization direction of the first bias layer can proximate the representative length of the first free layer, and the magnetization direction of the second bias layer can proximate the representative length of the second free layer. The bias layers are formed from ferromagnetic material and have a magnetic field in a fixed direction which can guide the direction of the initial magnetizations of the free layers in the periphery of the bias layers in the fixed direction. The shape and the position of the arrangement position of the bias layers are not limited, but can be disposed at upper and lower portions of a Z axis direction confronting the free layers, and at an interior portion of a direction of the Y axis. Further, the magnetization direction of the bias layer does not have to coincide with the direction of the representative length. That is, the MR element will function properly as long as the magnetization direction of the bias layer proximate the direction of the representative length.

As a result of the bias layers, the initial magnetization directions of the free layers can be easily fixed. Specifically, it is possible to control/cope with the individual delays of the bias layer among historical magnetizations by using the initial magnetization direction. Specifically, in order to do so, the bias layers are disposed on the free layer's surrounding (above or below, side, or behind).

Area Comparison

The MR element for reading a change in magnetic field of a magnetic recording medium according to a third aspect includes first and second electrode layers disposed along a moving direction of the magnetic recording medium for providing the sensing current. The first and second electrode layers can be disposed to be perpendicular to the ABS surface, which faces the magnetic recording medium (X-Z surface), and parallel to each other (X-Y surface). The first and second free layers can be disposed between the first and second electrode layers. The orientation of the magnetizations of the first and second free layers changes in accordance with an external magnetic field. A spacer layer composed of a non-magnetic material can be disposed between the first and second free layers. Further, the first and second free layers include an overlapping region in a vicinity of the ABS in which the first and second free layers overlap each other in the moving direction of the magnetic recording medium. Further, a surface area of a non-overlapping region at the first and second free layers is greater than a surface area of the overlapping region. Accordingly, the initial magnetizations of the first and second free layers are in a fixed direction. That is, the directions of the initial magnetizations of the first and second free layers intersect at a substantially perpendicular angle.

According to the various embodiments of the MR device, the free layers have a shape which includes a representative length and a representative width. However, the directions of the initial magnetizations of the free layers can be fixed by using the shape anisotropy of the length and width. Accordingly, the shape of the free layers is not limited as long as the initial magnetizations of the upper and lower free layers intersect at substantially a perpendicular angle. Further, the surface area of the overlapping region in which the first and second free layers overlap is preferably less than the surface area of the non-overlapping region. The free layers may have a shape of a smooth curve or a smooth bend rising on an X-Y plane.

Manufacturing Process

A method of manufacturing a MR element for reading a change in the magnetic field of a magnetic recording medium according to a first aspect includes: forming a first electrode layer on a substrate to be disposed perpendicularly to a moving direction of the magnetic recording medium; forming a first free layer on the first electrode layer, wherein a magnetization direction of the first free layer changes in accordance with an external magnetic field; selectively removing a peripheral portion of the first free layer so that the first free layer has a shape in which a ratio of a representative length to a representative width of the free layer is at least 2 to 1, filling the outer periphery of the first free layer with a first insulation material; depositing non-magnetic material on the first free layer to form a spacer layer; forming a second free layer on the spacer layer, wherein a magnetization direction of the second free layer changes in accordance with the external magnetic field; selectively removing a peripheral portion of the second free layer so that the second free layer has a shape in which a ratio of a representative length to a representative width is at least 2 to 1, a portion of the second free layer overlaps with a certain portion of the first free layer to define an overlapping region, and the representative lengths of the first and second free layers intersect each other in the layering direction; filling the outer periphery of the second free layer with a second insulation material; and forming a second electrode layer to be disposed on the second free layer so that sensing current flows between the first and second electrode layers.

An Air Bearing Surface (ABS) is formed by dicing over the overlapping region. In other words, the ABS is formed by grinding a proper portion. After dicing, a ratio of the representative length to representative width of the first free layer of one diced piece is 2 to 1. Further, a ratio of the representative length to representative width of the first free layer of the diced piece is 2 to 1.

The selectively removing of the peripheral portion of the first free layer can further include removing the peripheral portion of the first free layer so that the first free layer has a shape in which the ratio of a representative length to a representative width of the first free layer is at least 4 to 1. The selectively removing the peripheral portion of the second free layer can further include removing the peripheral portion of the second free layer so that the second free layer has a shape in which the ratio of a representative length to a representative width of the second free layer is at least 4 to 1. An Air Bearing Surface (ABS) is formed by dicing along a central portion of the overlapping region. Accordingly, two MR elements can be simultaneously formed by the above method.

BRIEF DESCRIPTION OF THE DRAWINGS

The accompanying figures, in which like reference numerals refer to identical or functionally similar elements, together with the detailed description below are incorporated in and form part of the specification and serve to further illustrate various exemplary embodiments and explain various principles and advantages in accordance with the various exemplary embodiments.

FIGS. 8A-14B are illustrations of a method of manufacturing a MR element according to an embodiment.

FIGS. 15A-17B are illustrations of a method of manufacturing a MR element according to another embodiment.

DETAILED DESCRIPTION

Figure 1:
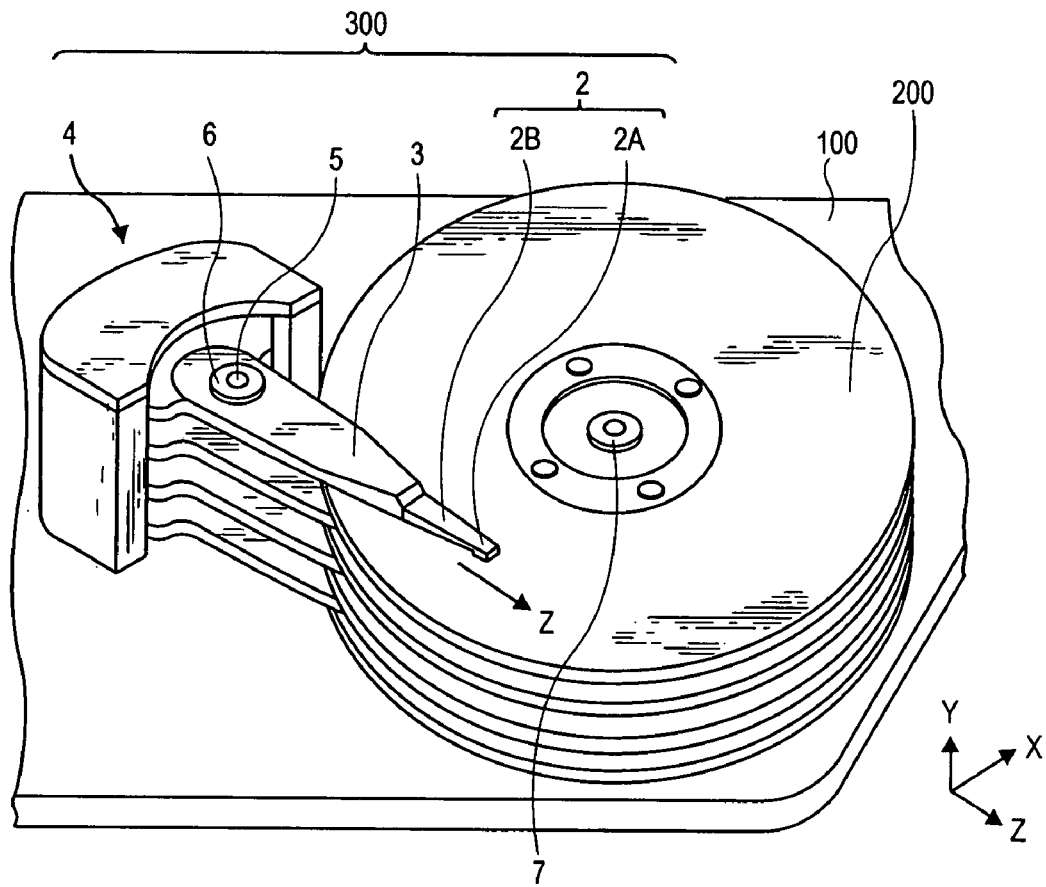
FIG. 1 is a perspective view showing a configuration of an actuator arm having a thin film magnetic head according to various embodiments.

Various embodiments of magneto-resistive (MR) device will be described in detail below by referring to the drawings.

First Embodiment

Referring now to FIGS. 1-5, a configuration of a Magneto-Resistive (MR) element, a thin film magnetic head, a head gimbals assembly, a head arm assembly, and a magnetic disk apparatus will be described below.

Magnetic Disk Apparatus

FIG. 1 is a perspective view showing the internal configuration of the magnetic disk apparatus according to the first embodiment. The magnetic disk apparatus employs, as the driving system, a CSS (Contact-Start-Stop) operating system. The magnetic disk apparatus can include, for example, a magnetic recording medium 200 on which information is to be recorded and a head arm assembly (HAA) 300 for recording/reading information to/from the magnetic recording medium 200 provided in a casing 100. The HAA 300 has a head gimbals assembly (HGA) 2, an arm 3 for supporting the base portion of the HGA 2, and a driving unit 4 as a power source for making the arm 3 swing. The HGA 2 includes a magnetic head slider (hereafter: "slider") 2A having a side face in which a thin film magnetic head 1 (shown in FIG. 2) is provided, and a suspension 2B having one end to which the slider 2A is attached. The other end (the end on the side opposite to the slider 2A) of the suspension 2B is supported by the arm 3. The arm 3 is swingable via a bearing 6 around a fixed shaft 5 fixed to the casing 100 as a center axis. The driving unit 4 is, for example, a voice coil motor or the like. Usually, the magnetic disk apparatus has a plurality of (four in FIG. 1) magnetic recording medium 200, and the slider 2A is disposed in correspondence with each of the recording faces (the surface and the back face) of each of the recording medium 200. Each of the sliders 2A can move in a direction (X-axis direction) corresponding to the track width direction of the magnetic recording medium 200 in a plane parallel to the recording face of the magnetic recording medium 200. On the other hand, the magnetic recording medium 200 rotates around a spindle motor 7 fixed to the casing 100 as a center in a direction almost orthogonal to the X-axis direction. By the rotation of the magnetic recording medium 200 and the movement of the slider 2A, information is recorded on the magnetic recording medium 200 or recorded information is read.

Slider

Figure 2:
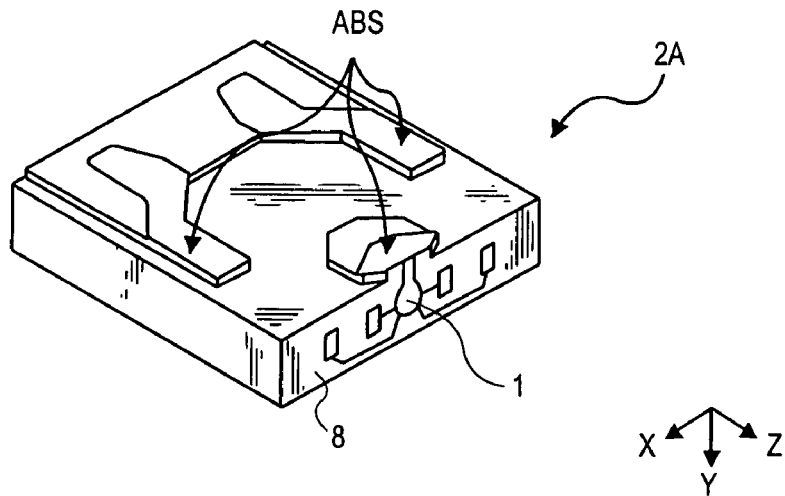
FIG. 2 is a perspective view showing a configuration of a slider in the actuator arm illustrated in FIG. 1.

FIG. 2 shows the configuration of the slider 2A illustrated in FIG. 1. The slider 2A has a base body 8 having a block shape made of, for example, AlTiC ($Al_2O_3TiC$). The base body 8 is formed in, for example, an almost hexahedron shape. One of the surfaces of the base body 8 is disposed so as to face close to the recording face of the magnetic recording medium 200. The surface that faces the recording face of the magnetic recording medium 200 is a recording medium facing surface, which will be referred to here as an air bearing surface (ABS). When the magnetic recording medium 200 rotates, the slider 2A floats from the recording surface along the direction (Y-axis direction) facing the recording surface by a lift caused by air current generated between the recording surface and the ABS, and a predetermined gap is created between the ABS and the magnetic recording medium 200. The thin film magnetic head 1 is provided in one side face orthogonal to the ABS of the base body 8.

Thin Film Magnetic Head

Figure 3:
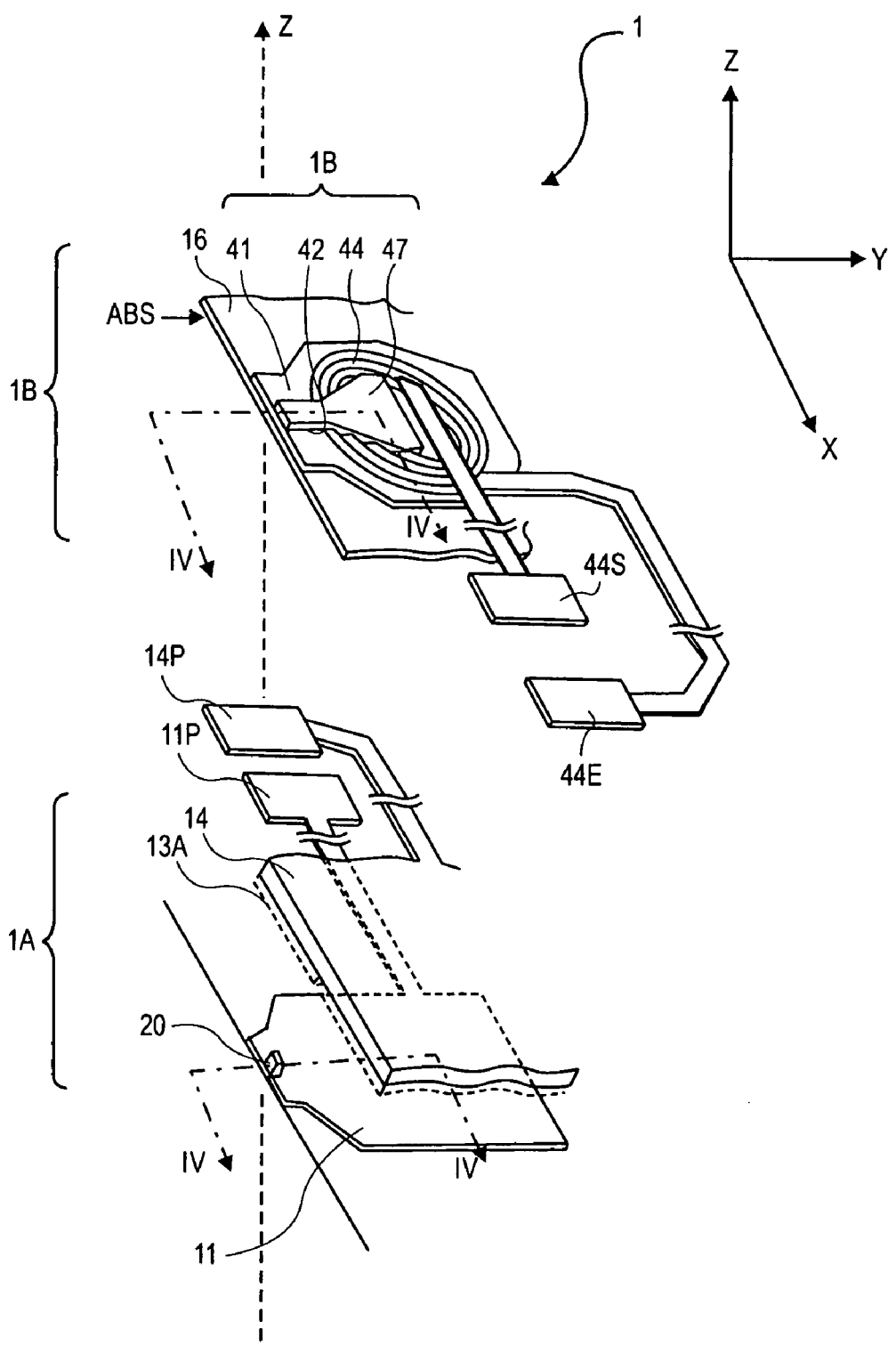
FIG. 3 is an expanded perspective view showing a configuration of the thin film magnetic head.
Figure 4:
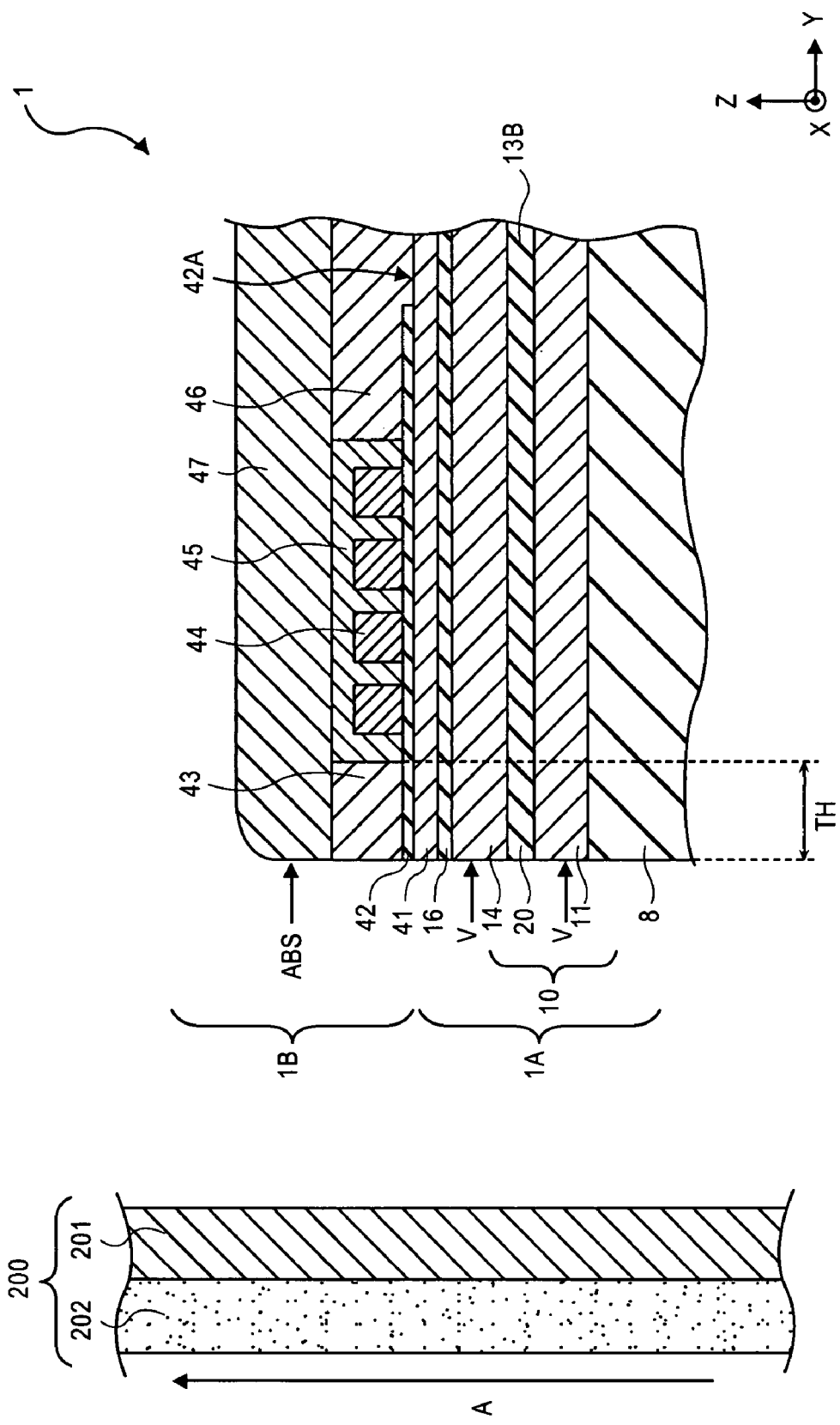
FIG. 4 is a cross sectional view of the thin film magnetic head taken along line IV-IV of FIG. 3.

FIG. 3 is an expanded perspective view showing the configuration of the thin film magnetic head 1. FIG. 4 is a cross sectional showing the structure taken along line IV-IV of FIG. 3. As shown in FIGS. 3 and 4, the thin film magnetic head 1 is constructed by integrating a read head part 1A for reading magnetic information recorded on the magnetic recording medium 200 and a recording head part 1B for recording magnetic information onto recording tracks of the magnetic recording medium 200.

The X, Y, and Z Axe

Regarding the X, Y and Z axes shown in FIGS. 1-4, a measurement in the direction of the X-axis can correspond to width, a measurement in the direction of the Y-axis can correspond to length, and a measurement in the direction of the Z-axis can correspond to thickness or height. A portion of the Y-axis disposed near the ABS will be referred to as a forward direction, and a portion of the Y-axis far from the ABS will be referred to as a rear direction. Further, movement in the forward direction of the Y-axis is referred to as forward and movement in the rear direction of the Y-axis is referred to as backward. As shown in FIG. 4, upper and lower portions of the Z-axis are defined along the moving direction (arrow A) of the magnetic recording medium 200. The recording head 1B is in the upper portion and the reading head 1A is in the lower portion. Right and Left of the X-axis are determined based upon the moving direction (Z-axis, stacking, or layering direction) of the recording medium 200 in a state in which the recording medium 200 faces the ABS.

Magnetic Recording Medium

The magnetic recording medium 200 includes a magnetization layer 201 disposed close to the thin film magnetic head 1 and a soft magnetic layer 202 disposed far from the thin film magnetic head 1. The magnetization layer 201 is for magnetically recording information. The soft magnetic layer 202 has the function of channeling the magnetic flux in the recording medium 200 (flux pass). This type of magnetic recording medium 200 is generally referred to as a double layered recording medium for perpendicular magnetic recording. The magnetic recording medium 200 can of course include other layers together with the magnetization layer 201 and the soft magnetic layer 202.

Reading Head

As shown in FIGS. 3 and 4, the read head part 1A includes a MR element 10 having a Current Perpendicular to the Plane-Giant Magneto-Resistive (CPP-GMR) structure constructed so that sensing current flows in the stacking direction.

Insulating Films

As shown in FIGS. 3 and 4, a lower electrode 11, an MR film 20, an insulating film 13A, 13B, and an upper electrode 14 are stacked in this order on a surface exposed to the ABS such as, for example, on the base body 8. The insulating film 13A, 13B is disposed to surround all of a periphery of the MR film 20 except for the ABS in the X-Y plane. Specifically, the insulating film 13A, 13B is constructed to include two portions: a first portion 13A (shown in FIG. 3) facing and sandwiching the MR film 20 in the X-axis direction; and a second portion 13B (shown in FIG. 4) occupying an area on the side opposite to the ABS while sandwiching the MR film 20.

Electrode

Each of the lower electrode 11 and the upper electrode 14 has a thickness of, for example, 1 μm to 3 μm and is composed of a magnetic metal material such as a nickel iron alloy (NiFe). The lower electrode 11 and the upper electrode 14 face each other while sandwiching the MR film 20 in the stacking direction (Z-axis direction) and function so that the influence of unnecessary magnetic fields is not exerted on the MR film 20. Further, as shown in FIG. 3, the lower electrode 11 is connected to a pad 11P, and the upper electrode 14 is connected to a pad 14P. The lower electrode 11 and the upper electrode 14 also serve as a current path for passing current to the MR film 20 in the stacking direction (Z axis direction).

MR Film

The MR film 20 has a spin valve (SV) structure in which a number of metal films including magnetic material are stacked. The read head part 1A having such a configuration reads recorded information by using the phenomenon that the electrical resistance of the MR film 20 changes according to a signal magnetic field from the magnetic recording medium 200. The detailed configuration of the MR film 20 will be described later.

Insulating Film

The insulating film 13A, 13B can have a thickness of, for example, 10 nm to 100 nm and is made of an insulating material such as aluminum oxide ($Al_2O_3$) or aluminum nitride (AlN). The insulating film 13A, 13B is mainly for providing electrical insulation between the lower electrode 11 and upper electrode 14.

An insulating film 16 is disposed above the read head part 1A (layer below the recording head part 1B). The insulation film 16 has a thickness of, for example, 10 nm to 100 nm and is made of an insulating material such as aluminum oxide ($Al_2O_3$) or aluminum nitride (AlN). The insulating film 16 has the role of providing electrical insulation between the read head part 1A and the recording head part 1B.

Recording Head Part

Subsequently, the configuration of the recording head part 1B will be described. As shown in FIG. 4, the recording head part 1B is formed on the insulating layer 16 of the read head part 1A and has a lower magnetic pole 41, a recording gap layer 42, a write shield 43, a coil 44, an insulating layer 45, a coupling part 46, and a return yoke 47.

Lower Magnetic Pole

The lower magnetic pole 41 is made of, for example, a magnetic material such as NiFe and is formed on the insulating layer 16. The recording gap layer 42 is made of an insulating material such as $Al_2O_3$ and is formed on the lower magnetic pole 41. The recording gap layer 42 has an opening portion 42A for forming a magnetic path in a position corresponding to the center part of the coil 44 in the X-Y plane. On the recording gap layer 42, the write shield 43, the insulating layer 45, and the coupling part 46 are formed in the same plane in order from the ABS. The coil 44 is buried in the insulating layer 45. The coil 44 is formed on the recording gap layer 42 around the opening portion 42A as a center and is made of, for example, copper (Cu) or gold (Au). Both terminals of the coil 44 are connected to electrodes 44S and 44E (See FIG. 3). The return yoke 47 is made of, for example, a magnetic material such as NiFe and is formed on the recording gap layer 42, the write shield 43, the insulating layer 45, and the coupling part 46 (refer to FIG. 4).

Write Shield Layer

The write shield layer 43 has the principal function of enlarging the perpendicular magnetic field gradient. The write shield layer 43 can be composed of a magnetic material having a high saturation magnetic flux density such as, for example, permalloy, an iron alloy, etc. Particularly, by receiving a wide component of the magnetic flux emitted from the lower magnetic pole 41, the write shield 43 achieves the following operations: (1) enlarging the magnetic field gradient of the perpendicular magnetic field; (2) narrowing the recording track width. However, similarly to the return yoke 47, the write shield layer 43 simultaneously has the function of circulating the magnetic flux. Further, the write shield layer 43 also serves the role of regulating the forward end position of the insulation layer 45 at the rear end of the write shield layer 43.

Return Yoke Layer

The return yoke 47 has the function of circulating the magnetic flux. The return yoke 47 can be composed of a material similar to that of the write shield 43. As shown in FIG. 4, the return yoke 47 extends from the ABS at the upper side of the write shield 43 to the coupling part 46 via the insulation layer 45. The return yoke 47 contacts the lower magnetic pole 41 though the opening portion 42a to be magnetically coupled therewith.

Overcoat Layer

Although not shown in the figures, an overcoat layer composed of a non-magnetic isolation material such as, for example, $Al_2O_3$ can be formed to cover the entire upper surface of the recording head portion 1B. The overcoat layer can protect the thin film head 1.

In the recording head part 1B having such a configuration, a magnetic flux is generated in a magnetic path constructed mainly by the lower magnetic pole 41 and the return yoke 47 by current flowing in the coil 44, and the magnetic recording medium 200 is magnetized by a signal magnetic field generated near the recording gap layer 42, thereby recording information.

MR Element and MR Film

Figure 5:
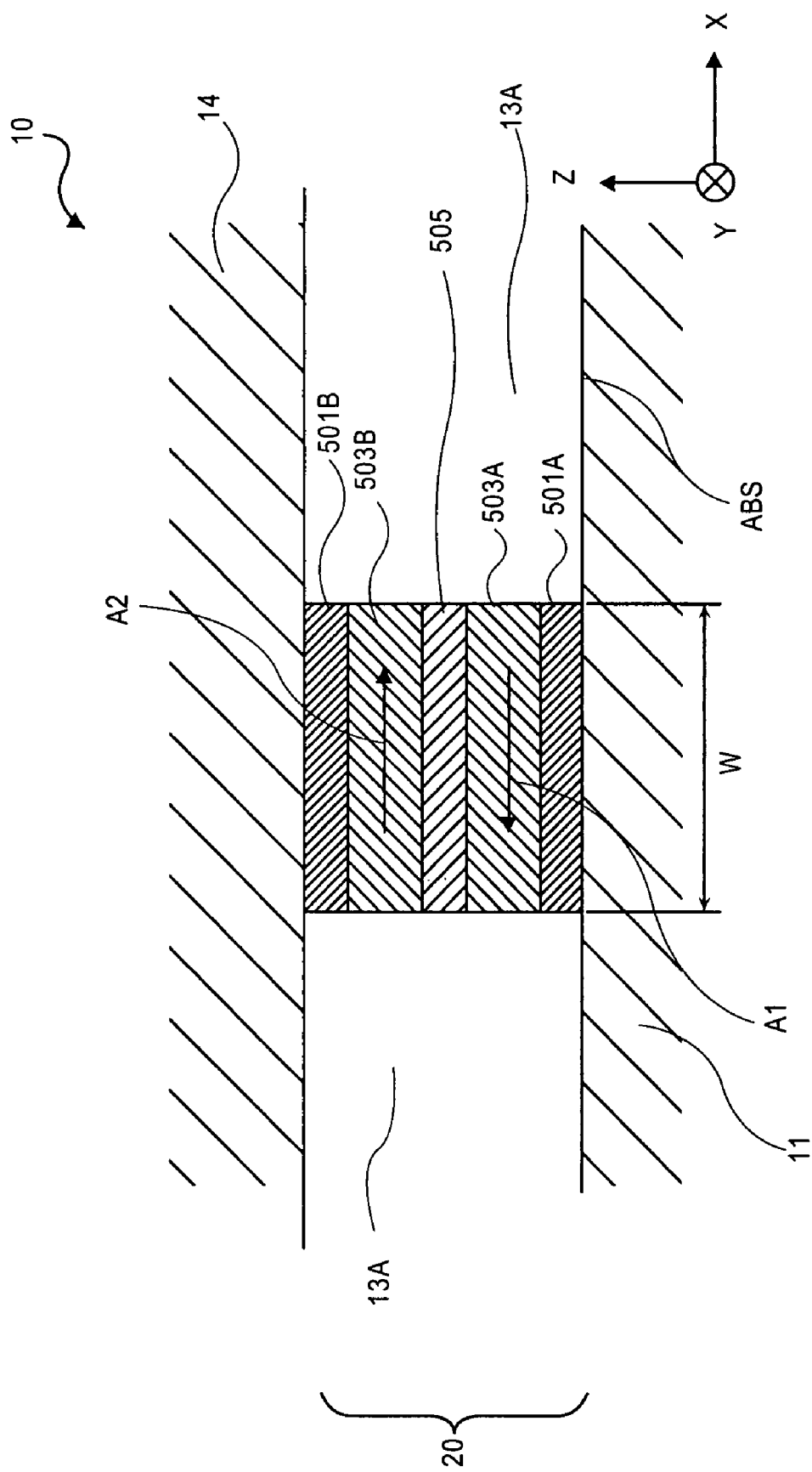
FIG. 5 is a front view of a MR film of the thin film magnetic head taken along line V-V of FIG. 4.
Figure 6A:
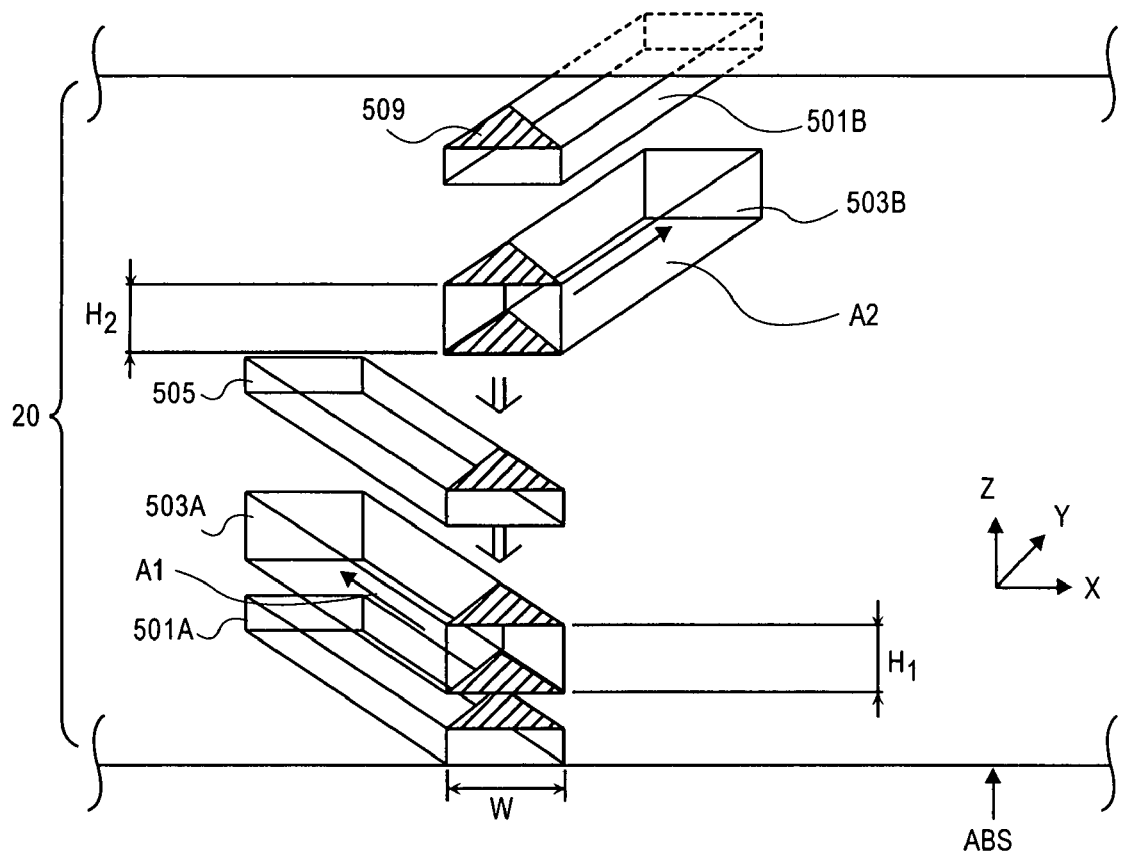
FIG. 6A is an expanded view of the MR film shown in FIG. 5.
Figure 6B:
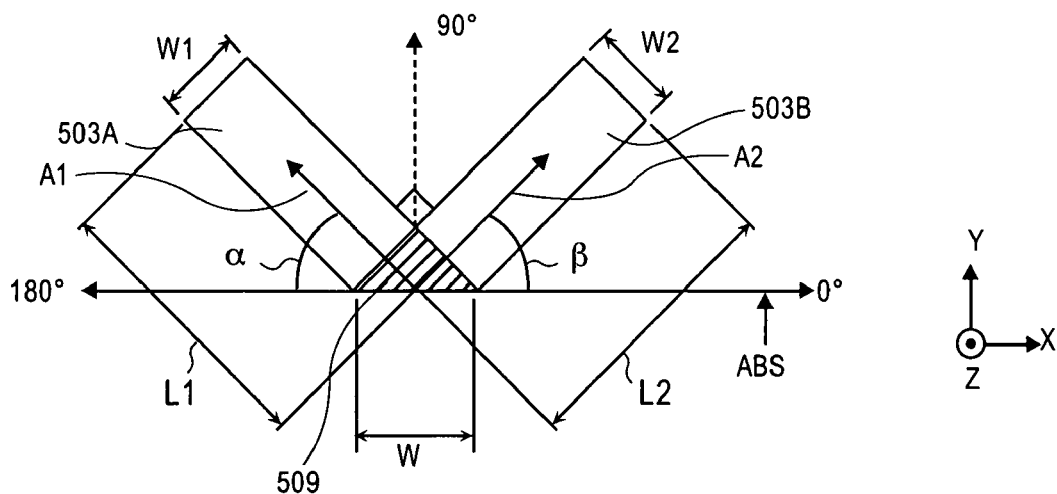
FIG. 6B is a plane view of the MR film shown in FIG. 6A.

Referring to FIGS. 5 and 6A-6B, a detailed configuration of the MR element 10 and the MR film 20 of the thin film magnetic head 1 will be described. FIG. 5 is a cross-sectional view of the MR element along line V-V of FIG. 4. FIG. 6A is an expanded view of the MR film 20 and FIG. 6B is a schematic view of magnetic free layers 503A and 503B from the Z-axis.

MR Film

The essential elements of the MR element 10 are shown in FIG. 5. The MR element 10 includes a lower metal gap layer 501A, a lower magnetization free layer (free layer) 503A, a non-magnetic spacer layer 505, an upper free layer 503B, and an upper metal gap layer 501B stacked in this order above the lower electrode 11 in the Z-axis direction. The upper electrode 14 is disposed above the upper metal gap layer 501B. The MR film 20 is composed of the layers from the lower metal gap layer 501A to the upper metal gap layer 501B.

Electrodes

The upper and lower electrodes 14 and 11 are disposed opposed to each other while sandwiching the MR film 20 having the above-described configuration in a direction (Z-axis direction) orthogonal to the stack face. At the time of reading magnetic information on the magnetic recording medium 200, the upper and lower electrodes 14 and 11 function as a current path for flowing the read current in the Z-axis direction to the MR film 20. Further, these electrodes can be formed from soft magnetic material and function as shield layers which obstruct magnetic fields.

Metal Gap Layers

The lower and upper metal gap layers 501A, 501B can be formed from a non-magnetic material such as, for example, Tantalum (Ta), Copper (Cu) or Gold (Au). The lower metal gap layer 501A serves the role of electrically joining the lower electrode 11 and the lower free layer 503A, but serves the role of magnetically isolating the lower electrode 11 from the lower free layer 503A. Similarly, the upper metal gap layer 501B serves the role of electrically joining the upper electrode 14 and the upper free layer 503B, but of magnetically isolating the lower electrode 14 from the upper free layer 503B. Therefore, metal gap layers 501A, 501B enhance the stability of the crystal structure of the upper and lower free layers 503B, 503A Further, the upper metal gap layer 501B has the function of protecting the MR film 20. It should be noted that the metal gap layers 501A, 501B are not essential elements of the MR film 20. For example, the metal gap layers 501A, 501B can be omitted by suitable combining material of the lower and upper electrodes 11, 14 and the upper and lower free layers 503B, 503A.

Spacer Layer

The spacer layer 505 of the CPP-GMR element can be composed of a non-magnetic metal having a highly efficient electrical conductive (low resistance) material such as, for example, gold or copper and have a thickness of 1 nm-5 nm, or preferably 3 nm. The spacer layer 505 has the primary function of decoupling the magnetic coupling of the upper and lower free layers 503B, 503A. A sensing current flowing during a read operation penetrates the spacer layer 505 to reach the upper free layer 503B after passing through the lower free layer 503A from the lower electrode 11 (alternatively in the reverse direction). At this time, because it is necessary to restrain scattering reception of the sensing current, the above-described non-magnetic spacer layer 505 formed from low resistive material is preferable. It should be noted that the spacer layer 505 may alternatively be formed from conductive material such as magnesium oxide (MgO) or aluminum oxide ($Al_2O_3$).

Magnetic Free Layer

A magnetization direction in the upper and lower free layers 503B, 503A changes in response to the size and orientation of an external signal magnetic field (signal magnetic field from the recording medium 200). In the present embodiment, the lower free layer 503A corresponds to a first magnetic free layer and the upper free layer 503B corresponds to a second magnetic free layer.

Materials of Upper and Lower Free Layers

The upper and lower free layers 503B, 503A can have a multilayer construction including a non-magnetic film formed from, for example, copper, and a ferromagnetic film formed from, for example, cobalt iron (CoFe) alloy and nickel iron (NiFe) alloy. The thickness of one of the upper and lower free layers 503B, 503A can be, for example, 2 nm-8 nm. It should be noted that the upper and lower free layers 503B, 503A can alternatively have a single layer construction formed from a ferromagnetic film such as CoFe alloy and NiFe alloy.

Shape of the Upper and Lower Free Layers

As shown in FIG. 6B, the upper and lower free layers 503B, 503A have a rectangular shape and include diagonally cut end portions disposed near the ABS when viewed from the Z-axis. The lower free layer 503A inclines to the left and the upper free layer 503B inclines to the rights with respect to FIGS. 6A-6B. The lower free layer and upper free layers 503A, 503B in the X-Y plane have measured longer sides represented by L1, L2 and measured shorter sides represented by W1, W2. The initial magnetizations are established in the longer side direction due to the shape anisotropy of the magnetizations shared by the ferromagnetic material. The present embodiment uses this property to establish the initial magnetizations of the upper and lower free layers 503B, 503A in the longer side directions. Here, initial magnetization refers to the magnetization direction when no magnetic field from the magnetic recording medium 200 is present. In FIG. 6B, the initial magnetization direction of the lower free layer 503A is shown as A1, and the initial magnetization direction of the upper free layer 503B is shown as A2.

As shown in FIG. 6A, the heights of the lower free layer 503A and the upper free layer 503B are shown as H1 and H2, respectively. These heights are not limited to particular parameters. For example, when both the upper and lower free layers 503B, 503A are made of the same material, both can have the same height. Further, when the upper and lower free layers 503B, 503A are made of different materials, the heights can be different in consideration of the magnetic properties of the different materials (primarily the rate of change in the magnetic resistance, magnetic retention, saturation magnetic flux density). Also, referring to FIG. 6B, the shape shown in the Z-axis direction is discretionary. The shapes of the upper and lower free layers 503B, 503A can be the same or different.

MR Region

The first and second free layers 503A, 503B include an overlapping region at a position in a vicinity of the ABS (region facing the ABS in this embodiment) in which the first and second free layers overlap each other in the Z-axis direction, and sandwich the spacer layer 505. The overlapping region is shown by the MR region 509 shaded with diagonal lines.

The MR region 509 has a shape of an isosceles triangle in which a base is related to the measured shorter side or width W1 or W2 of the free layer 503A, 503B by $\sqrt{2}$ ($2^{1/2}$), and a height that is equal to one half of the base. The size of the MR region 509 must be sufficiently large to recognize the change in the voltage resulting from the Magneto-Resistance of the MR film 20 as ON/OFF. Specifically, a measurement of the portion of the MR region 509 near the ABS (MR region width W) can be approximately 0.03 μm-0.1 μm.

Orientation of the Initial Magnetizations of the Free Layers

As shown in FIG. 6B, when the positive X-axis direction is defined as 0°, the positive Y-axis direction is defined as 90°, and the negative X-axis direction is defined as 180°, the inclination (α) of the lower free layer 503A with respect to the X-axis is 135°. On the other hand, the inclination (β) of the upper free layer 503B with respect to the X-axis is 45°. As described earlier, the initial magnetization directions of the lower and upper free layers 503A, 503B are fixed to exist in the same shape. Accordingly, as shown in FIG. 6B, the magnetization direction A1 of the lower free layer 503A is 135° and the magnetization direction of the upper free layer 503B is 45°. As a result, the two magnetization directions A1, A2 intersect at a 90 degree angle. Similarly, by arranging the first and second free layers 503A, 503B to intersect at a perpendicular angle, a state in which both of the initial magnetization directions A1 and A2 intersect at a right angle can be realized. Due to this construction, a bias layer for fixing the initial magnetizations becomes unnecessary. However, a bias layer can still be included.

Explanation of Read Operation

Next, the read operation of the MR device 10 and the thin film magnetic head 1 constructed as described above will be described with reference to FIGS. 3 to 6. In the thin film magnetic head 1, information recorded on the magnetic recording medium 200 is read by the read head part 1A. At the time of reading recorded information, the ABS faces the recording surface of the magnetic recording medium 200. In this state, a signal magnetic field from the magnetic recording medium 200 reaches the MR device 10. Read current is passed in advance in the stacking direction (Z-axis direction) via the lower electrode 11 and the upper electrode 14 to the MR film 20. Specifically, the read current is passed to an interior portion of the MR film 20 (MR region 509) in order of the lower metal gap layer 501A, lower free layer 503A, spacer layer 505, upper free layer 503B, and upper metal gap layer 501B or in the reverse order.

In the MR film 20, the magnetization directions of the lower and upper free layers 503A, 503B changes in accordance with the signal magnetic field. As a result, a change occurs in spin-dependent scattering of conduction electrons and the electrical resistance of the MR film 20 changes. The change in the electric resistance causes a change in output voltage. By detecting the current change, the information recorded on the magnetic recording medium 200 is read (See FIG. 7). Further, by providing the pair of insulating films 13A on the upper and lower free layers 503B, 503A facing the ABS, leakage of the read current flowing between the lower electrode 11 and the upper electrode 14 to the periphery is suppressed. That is, the read current does not expand in the X-axis direction but passes reliably while being limited in the MR region 509, so that a resistance change in the read current caused by a change in the magnetization direction of the lower and upper free layers 503A, 503B can be detected at higher sensitivity.

Character of the Scissor Shape

Figure 7:
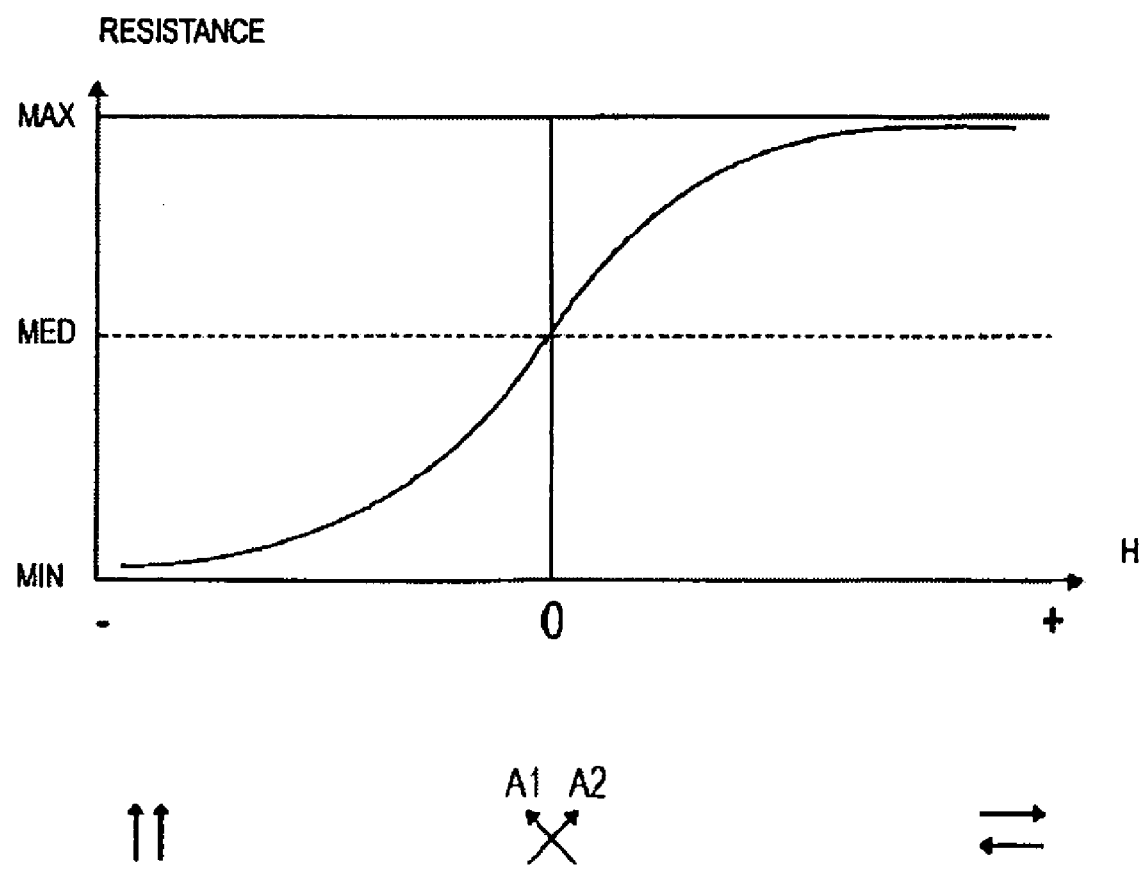
FIG. 7 is an illustration of the relationship between the magnetization directions and resistance.

The operation of the MR element 10 will now be described. In the graph of FIG. 7, the horizontal axis represents the change (negative to positive) in the magnetic field (H) and the vertical axis represents the change in value (smallest to largest) of the resistance of the MR element 10. Also, the relationship between the magnetization directions A1, A2 of the lower and upper free layers 503A, 503B in response to the state of the magnetic field is shown below the horizontal axis.

State of the Initial Magnetic Field

In a case in which the magnetic field is zero, the first and second magnetizations directions A1, A2 have angles of 45° and 135°, respectively, which intersect at a perpendicular angle on the coordinate axis shown in FIG. 6B. Here, the resistance has a value in the middle of the range. This is the initial magnetization state. The state in which the magnetization directions A1, A2 intersect at a perpendicular angle is set to depend on the shape of the lower and upper free layers 503A, 503B.

Positive Magnetic Field

When a positive magnetic field is provided from the movement of the magnetic recording medium 200, the first and second magnetization directions A1, A2 rotate together towards the Y-axis (90° direction as shown in FIG. 6B). Here, the movement of the first and second magnetization directions A1, A2 is 45° towards the Y-axis. As a result, the first and second magnetization directions A1, A2 are in a parallel state, and the resistance is extremely small.

Negative Magnetic Field

When a negative magnetic field is provided from the movement of the magnetic recording medium 200, the lower magnetization direction A1 rotates to the 180° of the X-axis. The upper magnetization direction A2 moves to 0° and the first and second magnetization directions A1, A2 are in an anti-parallel state. As a result, the resistance becomes extremely large. Similarly to the conventional scissor shaped MR element, the first and second free layers of the present embodiment can realize a parallel and anti-parallel state by the 45° rotation. The MR element of the present embodiment can read a change in the magnetic flux smaller than that of the conventional scissor shaped MR element.

Manufacturing Method 1

Referring to FIGS. 8A-17B, a method of manufacturing the MR element 10 of the thin film magnetic head 1 will be discussed. FIGS. 8A-14B illustrate a method of manufacturing a Tunnel Magneto-Resistance (TMR)-GMR element having a spacer layer 505 formed from magnesium oxide (Mg). FIGS. 15A-17B illustrate a method of manufacturing a CPP-GMR element having a spacer layer 505 formed from copper (Cu) to elaborate the differences with the TMR-GMR element. FIGS. 8A, 9A, 10A, 11A, 12A, 13A, 14A, 15A, 16A and 17A illustrate the manufacturing process of the MR element 10 from the perspective of the Z-axis (positive Z-axis). FIGS. 8B, 9B, 10B, 11B, 12B, 13B, 14B, 15B, 16B and 17B are cross sectional views of the MR element 10. The cross section shown becomes the ABS after completion of the manufacturing process.

Read Head

Figure 8A:
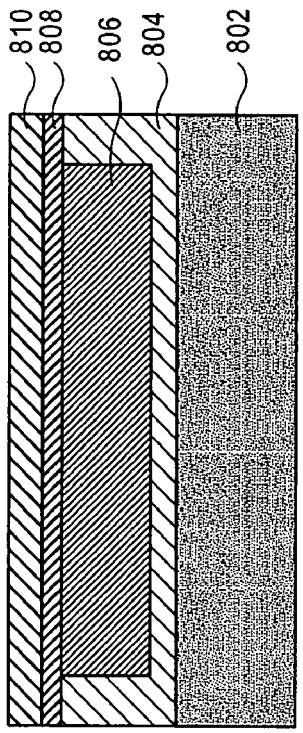
Figure 8B:
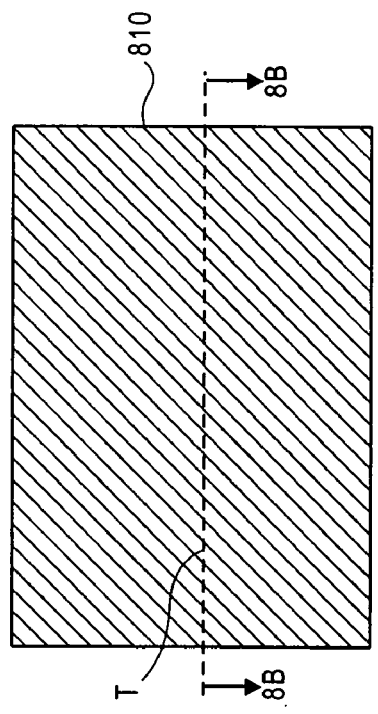

The manufacturing process of the read head is performed as described below. Process for manufacturing the first electrode and the free layer (Step 1):

Referring to FIG. 8B, an insulation layer 804 is deposited on the upper surface (positive Z axis) of a substrate 802. The substrate 802 can be the base body 8 shown in FIG. 1 which was made of, for example, AlTiC ($Al_2O_3TiC$). A first electrode layer (lower electrode layer 806) is formed on an interior portion of the insulation layer 804. Specifically, an interior portion of the insulation layer 804 is selectively removed and a metal for forming the lower electrode layer 806 is deposited in the interior portion of the insulation layer 804. The lower electrode layer 806 will provide a sensing current for flowing to and from a second electrode layer (upper electrode layer 1404) discussed later. Additionally, the lower electrode layer 806 serves as a magnetic shield layer. Further, a metal gap layer 808 is deposited over the entire upper surface of the lower electrode layer 806 and the insulation layer 804. A lower magnetization free layer 810, which will form the lower free layer 503A (as a first free layer) is stacked on the metal gap layer 808. The deposition and stacking of the layers can be performed by, for example, sputter deposition. The selective removal of the insulation layer 804 can be performed by, for example, conventional photolithography and etching techniques.

Figure 9A:
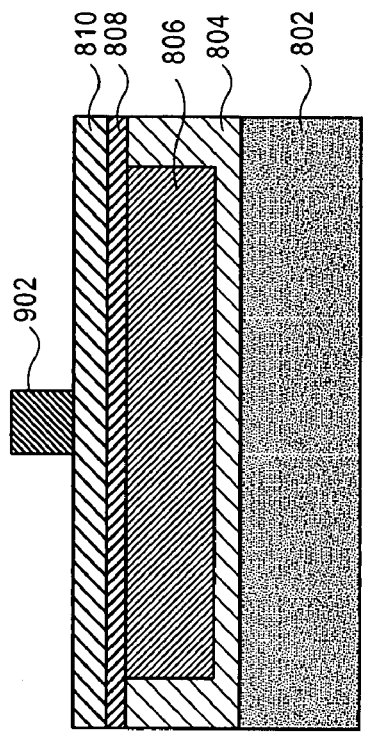
Figure 9B:
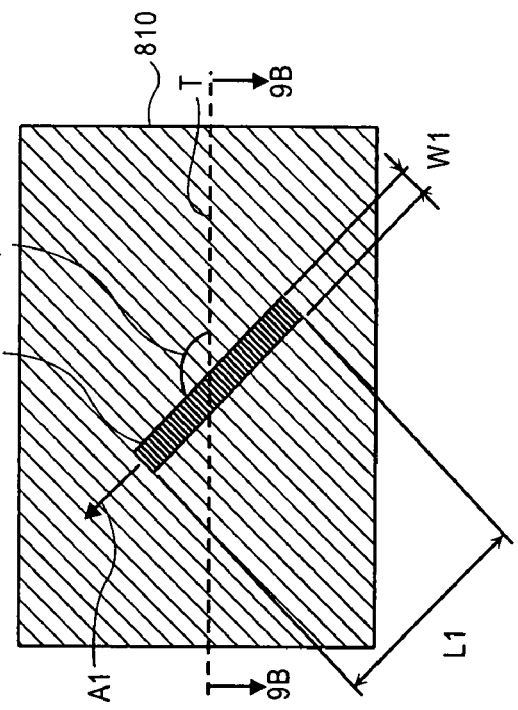

First Free Layer Formation Process (Step 2):

Next, a peripheral portion of the upper surface of the lower magnetization free layer 810 is selectively removed so that a ratio of a representative length to a representative width of the lower magnetization free layer 810 in the X-Y plane is at least 4 to 1. Specifically, as shown in FIG. 9A, a first photoresist layer 902 is deposited and patterned on the lower magnetization free layer 810. A ratio of a length L1 to a width W1 of the first photoresist layer 902 should be at least 4 to 1 because the length of the lower magnetization free layer 810 will be halved after having been diced in its midportion at the end of the manufacturing process. Further, an inclination Φ1 of the first photoresist layer 902 with the ABS line T will be 135°.

Next, a peripheral portion of the lower magnetization free layer 810 and the metal gap layer 808 are selectively removed by using the first photoresist layer 902 as a mask. Selective removal can be performed by, for example, a dry etching process such as reactive ion etching or ion milling, to dry etch to the lower electrode layer 806 and the insulation layer 804.

Figure 10B:
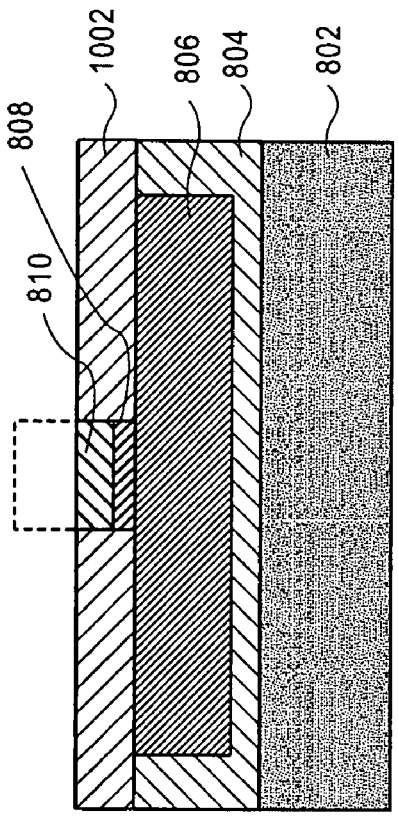
Figure 10A:
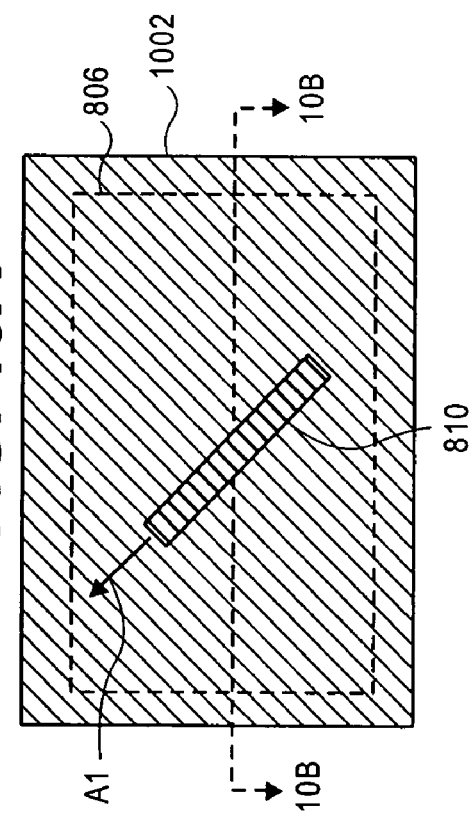

Filling Process (Step 3):

Referring to FIGS. 10A-10B, an outer periphery of the lower magnetization free layer 810 and the metal gap layer 808 is filed with insulation material. As a result, an insulation layer 1002 is disposed on both sides of the lower magnetization free layer 810 and the metal gap layer 808 by sputter deposition. The first photoresist layer 902 is removed and the lower magnetization free layer 810 and the insulation layer 1002 are flattened. Preferably, here the upper surface can be cleaned by, for example, reverses sputtering. Further, by annealing the lower magnetization free layer 810 for several hours while contributing a designated magnetic field at a designated temperature, the magnetization direction of the lower magnetization free layer 810 can be fixed. As shown in FIG. 10A, the magnetization direction A1 is in the length direction of the lower magnetization free layer 810.

Figure 11B:
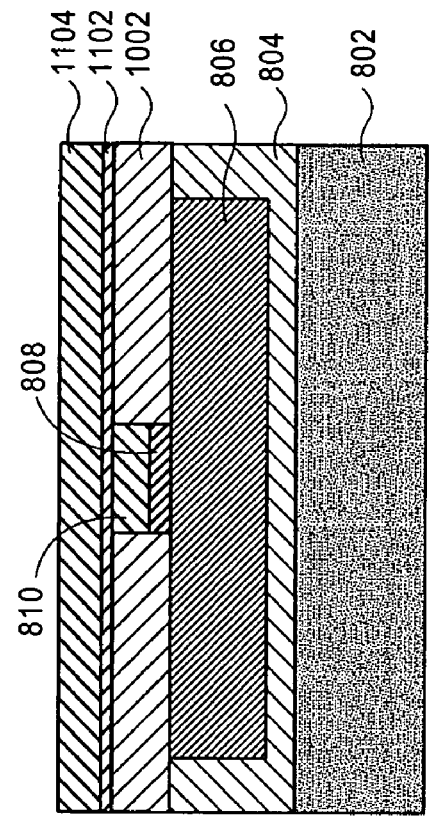
Figure 11A:
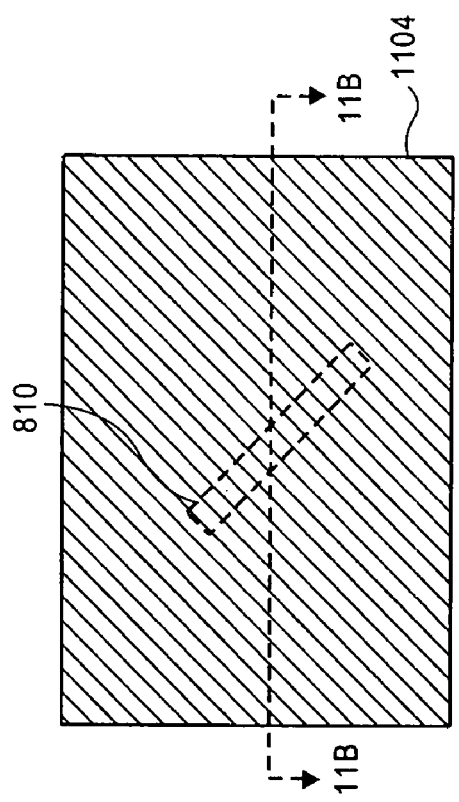

Formation of the Spacer Layer (Step 4):

Referring to FIGS. 11A-11B, a non-magnetic material is deposited on the lower magnetization free layer 810 and the insulation layer 1002 to form the spacer layer 1102. Particularly, the spacer layer 1102 is layered (stacked) over the entire upper surface of the lower magnetization free layer 810. The non-magnetic material of the spacer layer 1102 can be, for example, a non-conductive material such as magnesium oxide (MgO). The thickness (or height) of the spacer layer 1102 can be, for example, from 0.2 nm to 3 nm.

Formation of the Second Free Layer (Step 5):

Referring still to FIG. 11B, an upper magnetization free layer 1104 is formed on the spacer layer 1102 in the Z-axis direction. Particularly, the upper magnetization free layer 1104 is stacked on an entire upper surface of the spacer layer 1102. The upper magnetization free layer 1104 will form the second free layer. Preferably, the spacer layer 1102 and the upper magnetization free layer 1104 can be formed continuously/successively/together in order to avoid the risk of impurities adhering to a surface of the spacer layer 1102 due to the spacer layer 1102 being composed of only a thin film with a thickness of several nm.

Formation of the Second Free Layer (Step 6):

Referring to FIGS. 12A-12B, a second photoresist layer 1202 is formed on the upper magnetization free layer 1104. The second photoresist layer 1202 is formed to have a ratio of a length L2 to a width W2 of at least 4 to 1. For example, the length L2 can be 2.5 µm and the width W2 can be 0.05 µm. Further, as shown in FIG. 12A, the second photoresist layer 1202 is arranged to have an inclination φ2) with the ABS line T at 45°, and so that a central portion of the second photoresist layer 1202 is at the ABS line T. Here, an overlapping region 1204 in which a portion of the second photoresist layer 1202 overlaps with the lower magnetization free layer 810 is formed.

Next, the photoresist layer 1202 is used as a mask to selectively remove a peripheral portion of the upper surface of the upper magnetization free layer 1104. That is, dry-etching of the peripheral portion of the upper magnetization free layer 1104 is performed until the spacer layer 1102 is reached. As a result, the upper magnetization free layer 1104 and the spacer layer 1102 have different shapes when viewed from the Z-axis direction. Particularly, as shown in FIG. 13B, the spacer layer 1102 is a widening layer in the X-Y plane, while the upper magnetization free layer 1104 has the same width as the now removed second photoresist layer 1202.

After dry-etching the peripheral portion of the upper magnetization free layer 1104, the upper magnetization free layer 1104 and the lower magnetization free layer 810 intersect each other in the Z-axis direction along the length direction. Further, the overlapping region 1204 now includes a portion of the upper magnetization free layer 1104 overlapping with the lower magnetization free layer 810. The overlapping region 1204 will correspond to the MR region 509 shown in FIG. 6 after the manufacturing process is complete and the layered structure is diced.

Filling Process (Step 7):

Referring to FIG. 13B, an outer periphery of the upper magnetization free layer 1104 is filled with an insulation material by, for example, sputter deposition. As a result, an insulation layer 1302 is disposed on both sides of the upper magnetization free layer 1104. The photoresist layer 1202 is removed and the upper layer which includes the insulation layer 1302 and the upper magnetization free layer 1104 is flattened. Preferably, here the upper surface can be cleaned by, for example, reverses sputtering. Further, by annealing the upper magnetization free layer 1104 for several hours while contributing a predetermined magnetic field at a predetermined temperature, the magnetization direction of the upper magnetization free layer 1104 can be fixed. As shown in FIG. 13A, the magnetization direction A2 is in the length direction of the upper magnetization free layer 1104.

Figure 14B:
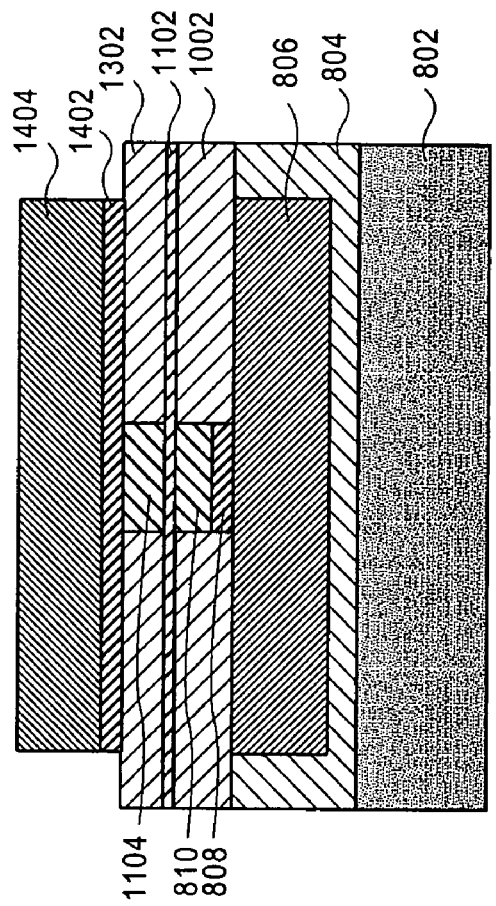
Figure 14A:
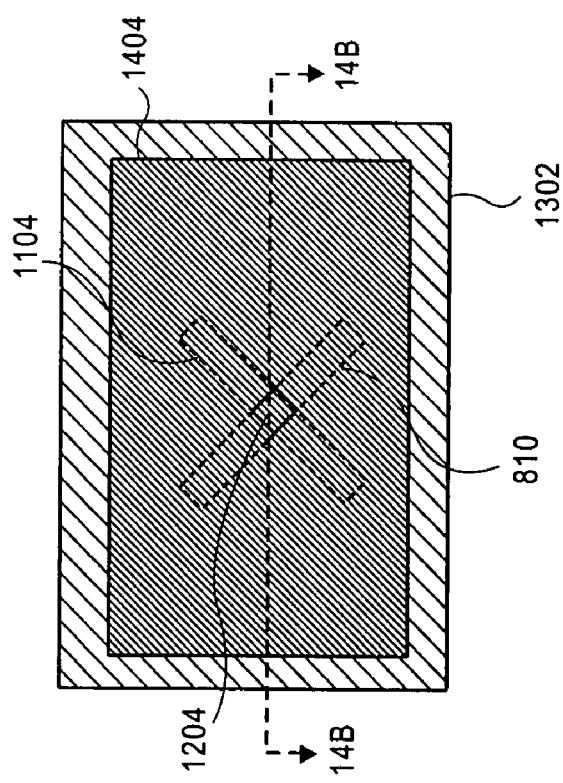

Forming the Second Electrode (Step 8):

Next, as shown in FIGS. 14A-14B, an upper metal gap layer 1402 and the upper electrode layer 1404 are successively formed on the upper surface of the upper magnetization free layer 1104 and the insulation layer 1302 to form the reading head 1A. Additionally, the upper electrode layer 1404 serves as a magnetic shield layer as well. The upper electrode layer 1404 and the lower electrode layer 806 correspond to the upper electrode 14 and lower electrode 11 for providing the sensing current.

Recording Head

To form the recording head 1B, the lower magnetic pole 41 and recording gap layer 42 are successively formed on the read head 1A. The coil 44 is selectively formed on the recording gap layer 42. Afterwards, the opening portion 42A is formed by etching a portion of the recording gap layer 42. Next, an insulation layer 45 is formed to cover the coil 44, and the write shield layer 43 and the coupling part 46 are successively formed. Finally, the recording head 1B is formed by forming the return yoke 47 to cover the entire upper surface.

ABS Formation Process

The layered structure is diced in the Z-axis direction through a central point of the overlapping region 1204 in which the upper and lower magnetization free layers 1104, 810 overlap by, for example, a wrapping process. In the present embodiment, the overlapping region 1204 is a point at which the central portions of the upper and lower magnetization free layers intersect, and dicing is performed along the ABS line to form the ABS. The ABS surface is shown in FIG. 14B, in which the layered structure has been diced into two portions so that the length of each of the upper and lower magnetization free layers 1104, 810 is halved.

Manufacturing Method 2

Referring to FIGS. 15A-17B, a method of manufacturing a CCP-GMR element using highly conductive material for the spacer layer will be discussed, with emphasis on differences with the method of manufacturing the TMR-GMR element.

Figure 15B:
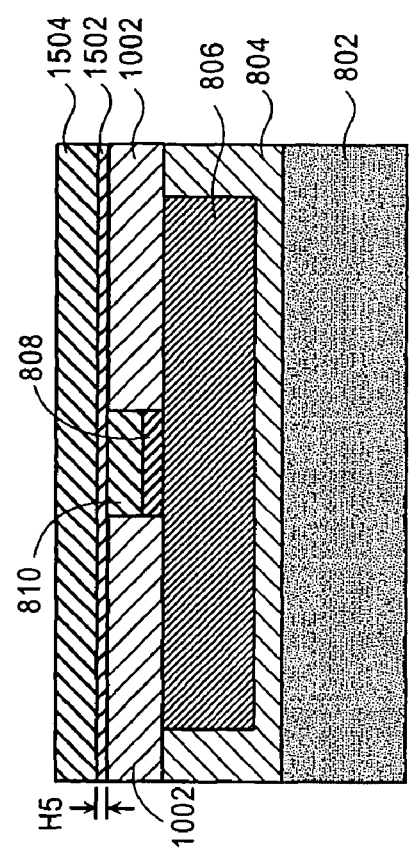

The method of forming the lower electrode layer 806, metal gap layer 808, lower magnetization free layer 810, and the first insulation layer 1002 on the outer periphery of the lower magnetization free layer 810 is similar to that of the TRM element. Referring to FIG. 15B, a non-magnetic material layer 1502 is entirely deposited on the lower magnetization free layer 810. The material of the non-magnetic material layer 1502 is Cu, a non-magnetic material. The height (or thickness) H5 of the non-magnetic material layer 1502 is 2 nm. Further, the upper free magnetic layer 1504 as the second free magnetic layer is layered over the entire upper surface of the non-magnetic material layer 1502.

Formation of the Second Free Layer

Figure 16B:
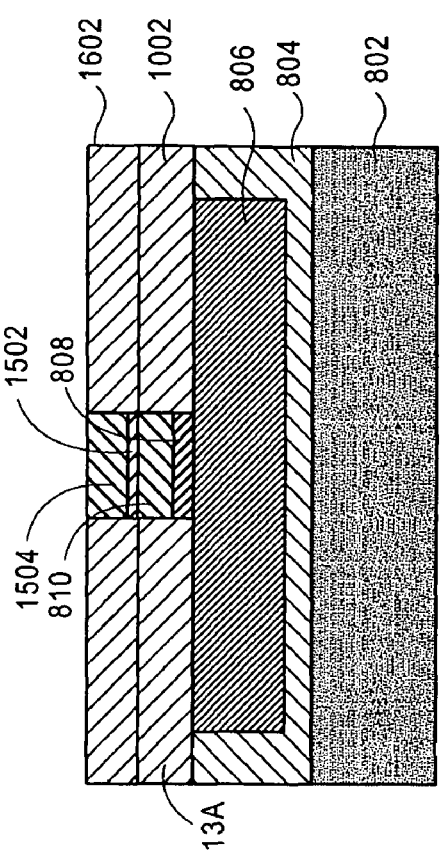
Figure 15A:
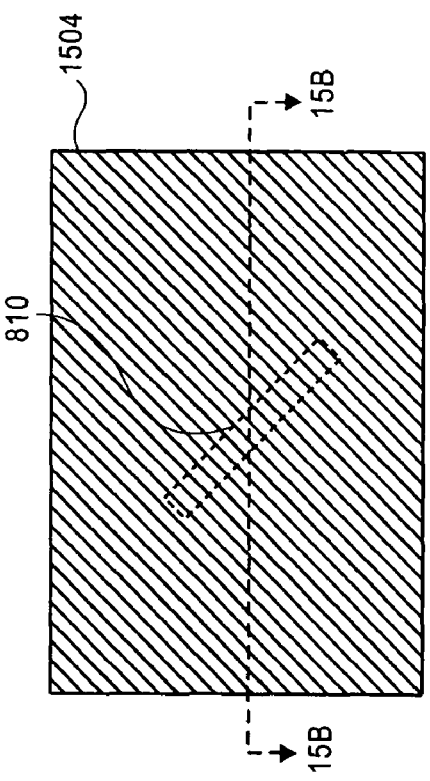
Figure 16A:
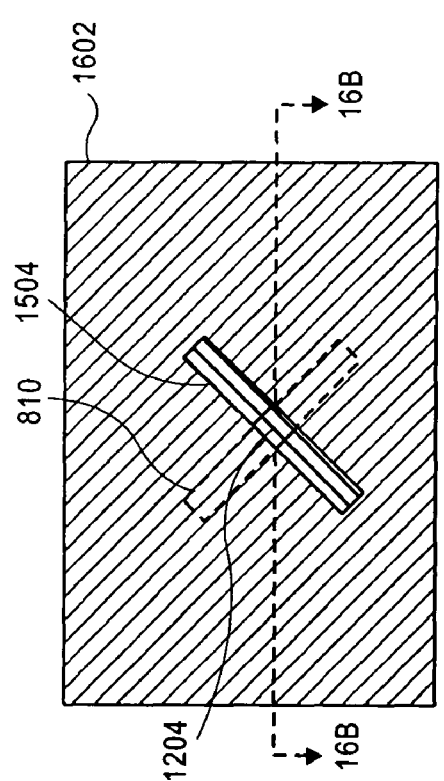

As shown in FIG. 16B, an outer peripheral portion of the upper magnetization free layer 1504 and the spacer layer 1502 is selectively removed until the upper surface of the first insulation layer 1002 is exposed. Specifically, a patterned photoresist layer (not shown) can be used as a mask similarly to as shown in FIG. 12B, however, a peripheral portion of the spacer layer 1502 as well as of the upper surface of the upper magnetization free layer 1504 is selectively removed by, for example, dry etching. As a result, the upper magnetization free layer 1504 and the spacer layer 1502 have the same shape when viewed from the Z-axis direction. Afterwards, insulation material is deposited on an outer periphery of the upper magnetization free layer 503B and the spacer layer 505. As a result, an insulation layer 1602 is disposed on both sides of the upper magnetization free layer 1504 and the spacer layer 1502. The photoresist layer is removed and the upper layer which includes the second insulation layer 1602 and the upper magnetization free layer 1504 is flattened. A cross section of the layered structure after flattening is shown in FIG. 16B.

Referring to FIGS. 17A-17B, the upper metal gap layer 1702 and the upper electrode 1704 are successively formed on the upper surface of the upper magnetization free layer 1504 and the second insulation layer 1602 to form the reading head 1A similarly to as discussed above with respect to FIGS. 14A-14B. The process for forming the recording head and dicing along the ABS line are also similar to as discussed above.

Differences Between Copper and MgO Material Used for the Spacer Layer

In the process for forming the CCP-GMR element discussed above with respect to FIGS. 8A-14B, the spacer layer is formed from a non-conductive material such as magnesium oxide and has a layered shape as shown in FIG. 13B. In the process for forming the TMR-GMR element discussed above with respect to FIGS. 15A-17B, the spacer layer is formed from a conductive material such as copper, and the outer periphery is removed so that the spacer layer and the upper magnetization free layer have the same shape when viewed from the Z-axis direction as shown in FIG. 16B. The different effects achieved by the two different spacer layers will be discussed below.

The sensing current flowing between the lower and upper electrodes 11, 14 must be prevented from spreading. Preferably, the sensing current passes only through an interior region of the MR region 509 shown in FIG. 6A. In the case in which the spacer layer 505 is composed of copper, if the spacer layer 505 is disposed in a wide region, there is a risk that the sensing current flowing between the lower and upper electrodes 11, 14 will spread. Thus, the read out of the resistance value from the change in the sensing current will become unstable and unclear. By forming the spacer layer 505 to have the same shape as the upper magnetization free layer 503B when it is made from conductive material, the overlapping region in which the spacer layer 505 overlaps with the lower magnetization free layer 503A is only the MR region 509. Other possible embodiments include forming the spacer layer 505 to only be in the MR region 509, or to have the same shape as the lower magnetization free layer.

On the other hand, in the case in which the spacer layer 505 is composed of non-conductive material, there is no need to take in consideration prevention of spreading between the lower and upper lower electrodes 11, 14. The sensing current will only flow through the MR region 509 in the spacer layer 505 because the non-conductive material makes it difficult for the sensing current to flow therethrough. Accordingly, in the case in which the spacer layer 505 is composed of non-conductive material, consideration of the shape of the spacer layer 505 is unnecessary. Thus, the spacer layer 505 can be formed to be a wide layer in the X-Y plane.

Ratio Between Length and Width

As discussed above, the ratio of length and width of each of the first and second magnetization free layers is at least 4 to 1 so that a ratio of at least 2 to 1 is ensured after the layered structure is diced. Further, two MR elements can simultaneously be formed by a single process. However, the embodiments are not limited to a ratio before dicing of 4 to 1. If a fabrication process in which a single MR element is formed by a single process, the ratio of length and width of each of the first and second magnetization free layers 503A, 503B can be at least 2 to 1 as long as the ABS can be formed in this state. Particularly, after dicing, the ratio of a representative width and representative length of each of the first and second magnetization free layers should be at least 2 to 1.

Second Embodiment

Figure 18:
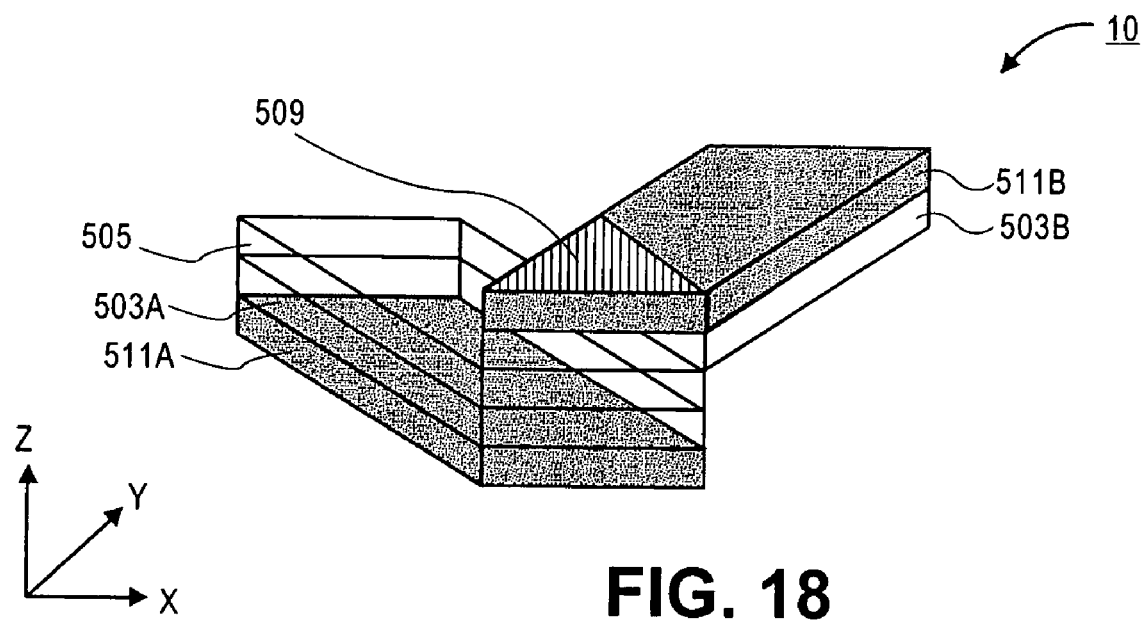
FIG. 18 is an illustration of a front view of a MR element according to another embodiment.

In a second embodiment, the MR element includes bias layers disposed on the first and second free layers to stabilize the magnetization directions. Although this configuration has the drawback of a larger reading head, it also has the advantage of easier control of the direction of the initial magnetization and stabilization. The MR element 10 of the second embodiment is shown in FIG. 18 from the perspective of the ABS in the Y-axis direction. The MR element 10 includes a lower electrode (now shown), a lower bias layer 511A disposed on the lower electrode, the lower free layer 503A, and a spacer layer 505 disposed on the lower free layer 503A. The three layers above the lower electrode 11 have the same shape in the Z-axis direction, incline with the X-axis at an angle of 135°, and have a length that is more than two times greater than the width. One reason for this three layer structure is to make the production process more efficient.

An upper portion of the MR element 10 includes an upper bias layer 511B disposed on an upper magnetization free layer 503B, which both have the same shape and are arranged to have the same inclination. The upper magnetization free layer 503B and the upper bias layer 511B are disposed to incline 45o from the positive X-axis so that the upper and lower magnetization free layers intersect, and both have a length that is more than two times greater than the width. The upper and lower bias layers 511B, 511A can be formed from an antiferromagnetic material. These bias layers 511B, 511A have predetermined contact area with the lower and upper free magnetization layers 503B, 503A which are formed from soft magnetic material respectively so that the initial magnetizations are set in a fixed direction. The fixed direction can be called a pin direction. Also, it can be called the bias layer a pin layer and the free magnetic layers formed form soft magnetic material a pinned layer. A method of fixing the initial magnetic direction of the free magnetization layers 503B and 503A are follows: a soft magnetic material is layered on an antiferromagnetic material in a matter that a predetermined exchange coupling is realized; the layers are annealed while a magnetic field is contributed. It is preferable to anneal the layers at 45° in the X direction from the ABS. A range from 0° to 5° of the anneal direction can be practical. The direction of the free magnetic layer's initial magnetization is mainly defined by a proportion of the pin direction, a strength of a pin effect, and the unique shape of the layers. The Pin effect is defined by the strength of the exchange coupling described above. The bias layers 511A, 511B can provide the capability of the metal gap layers of the first embodiment. Alternatively, a two layer structure including the metal gap layers and the bias layers can also be used.

Third Embodiment

Figure 19:
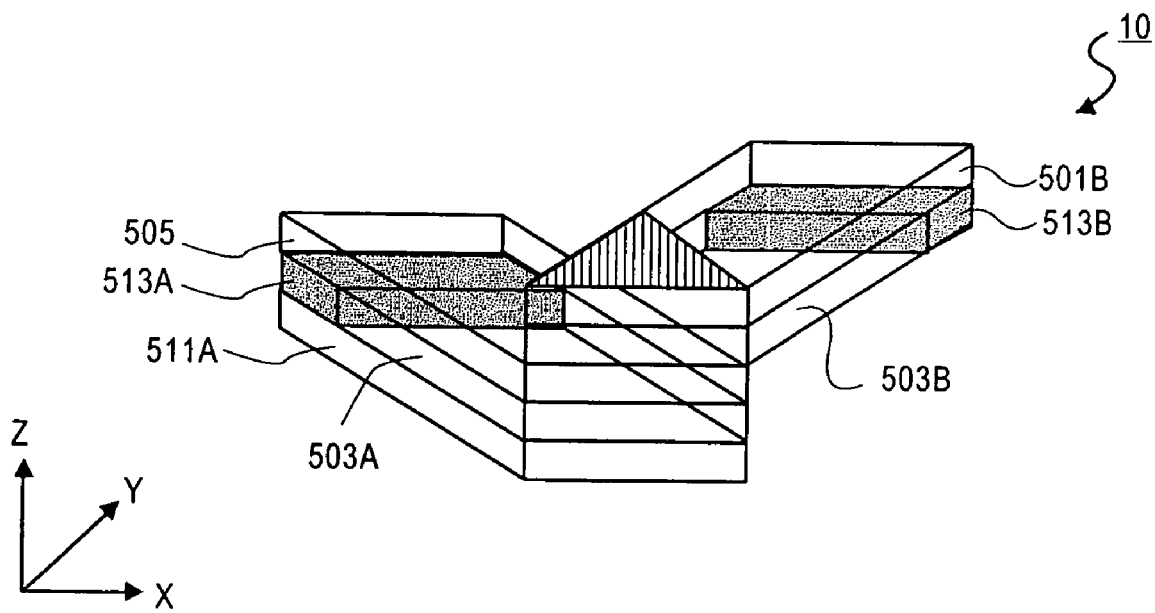
FIG. 19 is an illustration of a front view of a MR element according to another embodiment.

According to a third embodiment, the magnetization free layers include bias layers disposed on rear portions thereof for stabilizing the magnetization directions of the magnetization free layers. Referring to FIG. 19, a MR element 10 of the third embodiment is shown from the point of view of the Y-axis direction from the ABS. Specifically, a lower bias portion 513A is disposed in a region on the elongations of the lower magnetization free layer 503A in the lengthwise direction. An upper bias portion 513B is disposed in a region on the elongations of the upper magnetization free layer 503B in the lengthwise direction. Therefore, the initial magnetization directions of the upper and lower magnetization free layers 503B, 503A are attracted to the bias layers 513B, 513A positioned on the rear portions of the upper and lower magnetization free layers 503B, 503A. As a result, the initial magnetization directions can be easily set. Further, because no bias layer is stacked in the Z-axis direction, the MR element 10 can be made thinner. Several ratios can be suitably set in accordance with the properties of the materials from which they are made. For example, there are a ratio of the representative length of the free layers, or a ratio of the length of the bias layers, or a ratio of the representative length of the free layer and the length of the bias layer.

Fourth Embodiment

Figure 20:
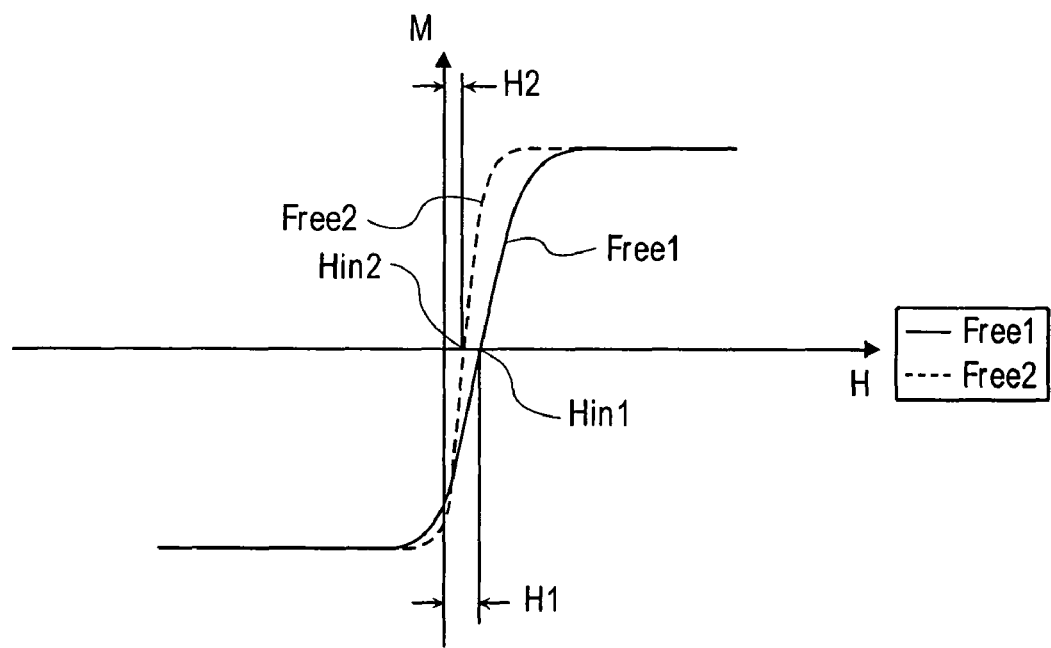
FIG. 20 is a magneto-hysteresis loop chart of free layer 1 and free layer 2.

According to a fourth embodiment, the properties of the magnetic material (magnetization delay Hin) for providing the magnetization free layers is taken into consideration in performing adjustment of the initial magnetizations. FIG. 20 illustrates an exemplary curve obtained from historical magnetic data of the first magnetization free layer (Free1) and the second magnetization free layer (Free2). For easy understanding, effect of magnetic retentive power has now shown in the drawing, the delay of the hysteresis curve for the first magnetization free layer is referred to as Hin1 and the delay of the hysteresis curve for the second magnetization free layer is referred to as Hin2. Both are shown as values of the magnetic field in the X coordinates. Here, Hin1 is greater than Hin2.

Figure 21:
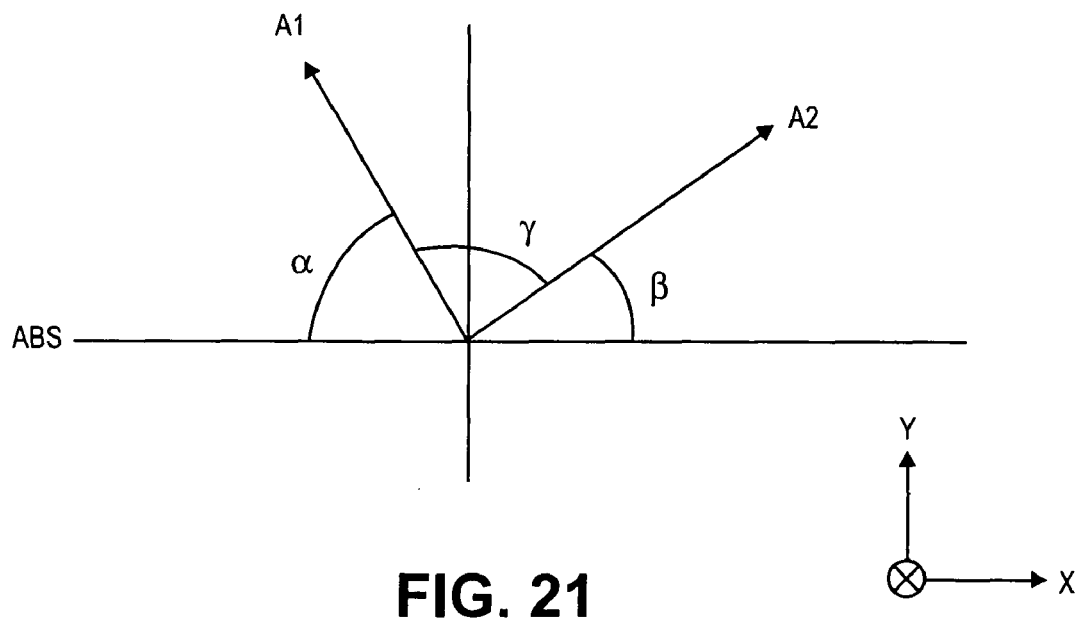
FIG. 21 is a schematic chart illustrating initial magnetization directions A1 and A2.

Adjustment of the angle between the inclinations of the first and second initial magnetizations A1, A2 is preferable for the present construction in which the hysteresis delays (Hin1, Hin2) are present. FIG. 21 shows the inclinations of the initial magnetizations in the Z-axis direction. The angle between the inclination of the first initial magnetization A1 and the ABS is shown as $\alpha$, the angle between the inclination of the second initial magnetization A2 and the ABS is shown as $\beta$, and the angle between the first and second initial magnetizations A1, A2 is shown as $\gamma$.

An MR element not having the delays Hin1, Hin2 of the above-described hysteresis curve can be implemented by setting values of $\alpha=\beta=45°$, and $\gamma=90°$. In a case in which delays Hin1, Hin2 are present, values of $\alpha$, $\beta$, and $\gamma$ for the a MR element can be suitably set so a change of the magnetoresistance opposing/in accordance with the change in the magnetic field by the magnetic recording medium becomes uniform. For example, the values of $\alpha$ and $\beta$ can be between 30° and 60°, and the value of $\gamma$ can be between 60° and 120°.

Other Embodiment

In the embodiments described above, the magnetization free layers are oriented in a set direction from the ABS and have an upright shape on the X-Y plane (approximately flat parallelepiped board shaped). The magnetization free layers of the present embodiment merely need to have a predetermined surface area in the vicinity of the ABS and initial magnetizations that intersect each other at a fixed angle. For example, the thickness in the length direction of the MR region can have a changing shape, and the magnetization free layers can each have a shape that is curved left and right and the length direction.

What is claimed is:

1. A magnetoresistive element (MR element) for reading a change in a magnetic field of a magnetic recording medium, the MR element comprising:
   first and second electrode layers for providing a sensing current, the first and second electrode layers disposed in parallel to each other along a moving direction of the magnetic recording medium, and perpendicular to an air bearing surface (ABS) facing the magnetic recording medium;
   first and second free layers disposed between the pair of electrode layers in a stacking configuration, the first and second free layers having a magnetization direction which changes in accordance with an external magnetic field; and
   a spacer layer composed of non-magnetic material and disposed between the first and second free layers, wherein:
   a ratio of a representative length and a representative width of each of the first and second free layers is at least 2 to 1, to thereby provide initial magnetizations along a direction of the representative length of each of the first and second free layers, the representative width and the representative length defined in a plane perpendicular to the ABS; and the first and second free layers include an overlapping region in a vicinity of the ABS in which the first and second free layers overlap each other in the moving direction of the magnetic recording medium, the first and second free layers overlapping each other at a substantially perpendicular angle, and
   the first and second free layers respectively include first and second bias layers in rear portions of the first and second free layers so that no bias layer is present at a rear portion of the overlapping region.

2. The MR element according to claim 1, wherein the first and second free layers intersect the ABS at equal and opposite angles.

3. The MR element according to claim 1, wherein the representative length and representative width of the first free layer are substantially same as the representative length and representative width of the second free layer, respectively.

4. The MR element according to claim 1, wherein a magnetization direction of the first bias layer is approximately in the direction of the representative length of the first free layer and a magnetization direction of the second bias layer is approximately in the direction of the representative length of the second free layer.

5. The MR element according to claim 4, further including another bias layer disposed on the first and second free layers to stabilize the magnetization directions.

6. The MR element according to claim 1, wherein a thickness of the first free layer is substantially same as a thickness of the second free layer.

7. The MR element according to claim 1, wherein the MR element is implemented within a thin film magnetic head.

8. A head gimbal assembly comprising;
   a magnetic head slider having, on one side thereof, a thin film magnetic head having the MR element according to claim 1; and
   a suspension whose one end is provided with the magnetic head slider.

9. A head arm assembly having;
   a magnetic head slider, on one side thereof, a thin film magnetic head having the MR element according to claim 1;
   a suspension whose one end is provided with the magnetic head slider; and
   an arm for supporting the other end of the suspension.

10. A magnetic disk apparatus including the magnetic recording medium and a head arm assembly; the head arm assembly having
    a magnetic head slider, on one side thereof, a thin film magnetic head having the MR element according to claim 1;
    a suspension whose one end is provided with the magnetic head slider; and
    an arm for supporting the other end of the suspension.

11. The MR element according to claim 1, wherein a thickness of the first bias layer is substantially identical to that of the first free layer, and a thickness of the second bias layer is substantially identical to that of the second free layer.

12. The MR element according to claim 1, wherein a volume of the first bias layer is less than that of the first free layer, and a volume of the second bias layer is less than that of the second free layer.

13. A magnetoresistive element (MR element) for reading a change in magnetic field of a magnetic recording medium, the MR element comprising:
    first and second electrodes for providing a sensing current disposed along a moving direction of the magnetic recording medium, the first and second electrodes disposed in perpendicular to an Air Bearing Surface (ABS) facing the magnetic recording medium, and in parallel to each other;
    first and second free layers layered between the first and second electrodes, wherein orientations of the magnetizations of the first and second free layers changes in response to an external magnetic field; and
    a spacer layer formed from a non-magnetic material and disposed between the first and second free layers,
    wherein the first and second free layers include an overlapping region in a vicinity of the ABS in which the first and second free layers overlap each other in the moving direction of the magnetic recording medium, wherein a surface area of the overlapping region is less than a surface area of a non-overlapping region, and wherein the first and second free layers respectively include first and second bias layers in rear portions of the first and second free layers so that no bias layer is present at a rear portion of the overlapping region, and the first and second free layers have a predetermined shape so that initial magnetizations of the first and second free layers intersect at approximately a perpendicular angle.

* * * * *